United States Patent
McFarland et al.

(10) Patent No.: US 8,229,905 B2
(45) Date of Patent: Jul. 24, 2012

(54) ADAPTIVE DOCUMENT MANAGEMENT SYSTEM USING A PHYSICAL REPRESENTATION OF A DOCUMENT

(75) Inventors: Max E. McFarland, Sunnyvale, CA (US); Robert Alexander, Santa Clara, CA (US); Michael G. E. Griffin, Redwood City, CA (US); Jonathan J. Hull, San Carlos, CA (US)

(73) Assignee: Ricoh Co., Ltd., Tokyo (JP)

( * ) Notice: Subject to any disclaimer, the term of this patent is extended or adjusted under 35 U.S.C. 154(b) by 1035 days.

(21) Appl. No.: 11/159,559

(22) Filed: Jun. 22, 2005

(65) Prior Publication Data
US 2006/0161562 A1    Jul. 20, 2006

Related U.S. Application Data

(60) Provisional application No. 60/644,357, filed on Jan. 14, 2005.

(51) Int. Cl.
G06F 7/00 (2006.01)
G06F 17/00 (2006.01)

(52) U.S. Cl. .......................................... 707/695; 707/711
(58) Field of Classification Search ................ 707/1–10, 707/695, 711; 705/3, 51
See application file for complete search history.

(56) References Cited

U.S. PATENT DOCUMENTS

| | | | |
|---|---|---|---|
| 6,330,976 B1 * | 12/2001 | Dymetman et al. | 235/487 |
| 6,518,950 B1 * | 2/2003 | Dougherty et al. | 345/156 |
| 6,850,252 B1 * | 2/2005 | Hoffberg | 715/716 |
| 7,181,017 B1 * | 2/2007 | Nagel et al. | 380/282 |
| 2002/0010679 A1 * | 1/2002 | Felsher | 705/51 |
| 2002/0083079 A1 * | 6/2002 | Meier et al. | 707/104.1 |
| 2002/0111960 A1 * | 8/2002 | Irons et al. | 707/204 |
| 2004/0019613 A1 * | 1/2004 | Jones et al. | 707/200 |
| 2005/0013462 A1 * | 1/2005 | Rhoads | 382/100 |
| 2005/0150944 A1 * | 7/2005 | Melick et al. | 235/375 |
| 2006/0285772 A1 * | 12/2006 | Hull et al. | 382/305 |

FOREIGN PATENT DOCUMENTS

| | | |
|---|---|---|
| JP | 10143414 | 5/1998 |
| JP | 2000200262 | 7/2000 |

OTHER PUBLICATIONS

Kofax, A Dicom Group Company, Retrieved from the Internet: <URL: http//www.kofax.com/ [retrieved on Sep. 15, 2005].

(Continued)

*Primary Examiner* — Usmaan Saeed
*Assistant Examiner* — Navneet K Ahluwalia
(74) *Attorney, Agent, or Firm* — Patent Law Works LLP

(57) ABSTRACT

Systems and methods for creating a Token and using it to operate and modify a case file in a document management system are described. An exemplary embodiment of a Token includes a representation of a case file. A Token may include a representation of a document associated with the case file, where the representation may include a brief description or visual summary of the document with an associated link to an electronic version of the document. In another exemplary embodiment, the Token may be used to facilitate retrieval and viewing of an electronic version of a document using its associated link. In another exemplary embodiment, the Token may be used to update the case file based on user input on the Token.

37 Claims, 24 Drawing Sheets

OTHER PUBLICATIONS

Captiva, "Managing Input Across the Enterprise", Retrieved from the Internet: <URL: http//www.captivasoftware.com/index.asp [retrieved on Sep. 15, 2005].

ScanSoft®, Retrieved from the Internet: <URL: http//www.scansoft.com/ [retrieved on Sep. 15, 2005].

Thomas W. Malone, How Do People Organize Their Desks? Implications for the Design of Office Information Systems, ACM Transactions on Office Information Systems, v. 1, No. 1, Jan. 1983, 99-112.

Japanese Office Action, Japanese Patent Application No. 2006-004236, Sep. 6, 2011, 5 pages.

* cited by examiner

FIG. 5D

ADAPTIVE DOCUMENT MANAGEMENT SYSTEM USING A PHYSICAL REPRESENTATION OF A DOCUMENT

CROSS REFERENCE TO RELATED APPLICATIONS

This application claims the benefit of U.S. Provisional Application No. 60/644,357, filed Jan. 14, 2005, entitled "Tokens: A Document Based System For Adaptive Document Retrieval, by Max E. McFarland, Robert Alexander, Michael G. E. Griffin and Jonathan J. Hull, which is incorporated by reference in its entirety.

BACKGROUND OF THE INVENTION

1. Field of the Invention

This invention relates generally to document management systems. More particularly, the present invention relates to a system for storing, retrieving and accessing files of data using a physical representation of the files such as a paper token.

2. Background of the Invention

Typical workflow and document management systems can track the state of many cases. FIG. 1 is an abstract representation of a typical workflow and document management system 100. A document 110, associated with a particular case, is input into a document management database 120 through scanning or direct electronic generation. A workflow engine 130 controls workflow associated with each of the cases, which may include many documents in the database 120. When an event associated with a case occurs, a user 140 performs an appropriate action or response, and the state of the case is updated in the document management database 120. Typically, these user interactions occur via an input device and an output device associated with a personal computer (PC) 150. A major problem with electronic only systems is that they lack many of the attributes of paper or other physical representations such as: an ability manage workflow using the physical presence of the paper, confirmation of delivery and content are automatic, ability to support comments annotation and markup, at a glance overview, and preferred for reading and review.

Forms processing software is known in the art such as programs available from Captiva Software Corporation; ScanSoft, Inc.; and Kofax Image Products. These products are designed to facilitate the entry of data from a paper form into an electronic database. However, none of these systems provide any mechanisms to use physical representations of documents to access, manipulate or annotate electronic forms stored in the electronic database. In addition to lacking a paper-based interface, none of these systems provides semi-automatic or automatic generation of physical representations to provide such functionality.

SUMMARY OF THE INVENTION

The system of the present invention provides a user interface that uses a physical representation of data stored electronically in the system. The physical representation, hereinafter referred to as a "Token," is preferably one or more sheets of paper, and includes information or meta data about a file or group of files; information about the state of a case; and an abbreviated view of one or more of the documents associated with the case. The content of the token is adapted to optimize the user interaction with the system and different tokens are provided for different input and interactions with the system. The Token system of the present invention includes a token generation unit, a document retrieval unit, an annotation unit, and an interface unit. The Token system is preferably coupled to a document management system, a database, a workflow engine, and other computing devices that store electronic files and documents. The Token system is preferably coupled to conventional input and output devices such as a printer for producing the Tokens. The present invention also includes several methods such as: a method for retrieving documents using a token; a method for retrieving views of documents that might be highly relevant to the case's current state; and a method for updating the state of the case in a database. The Token allows users to interact with relevant documents in a known way similar to the handling of paper forms, but also provides methods for retrieving electronic representations for any document on demand and methods for affecting the state of the case, or changing information in the system.

In one embodiment, the present invention is an interface for a document management system storing electronic documents and associated information in a database. Tokens provide a compact, convenient, flexible, and easy-to-use representation for a few to a huge collection of individual documents. The user is provided with a Token that includes information regarding documents and relevant to a particular case that the user may need to respond to an event associated with the current state of the case. In addition, Tokens provide a way for users to organize their responses to more than one pending case. Tokens can be stacked, re-arranged, organized, and selectively processed similar to a user were dealing with a paper file system. This provides the advantages of security and accessibility of an electronic storage system and at the same time preserves the paper-based work practice to which users are accustomed and on which their productivity depends.

BRIEF DESCRIPTION OF THE DRAWINGS

FIG. 5D is a graphical representation of an exemplary representation of a final page of the Token of FIG. 4.

DETAILED DESCRIPTION

Figure 1A:
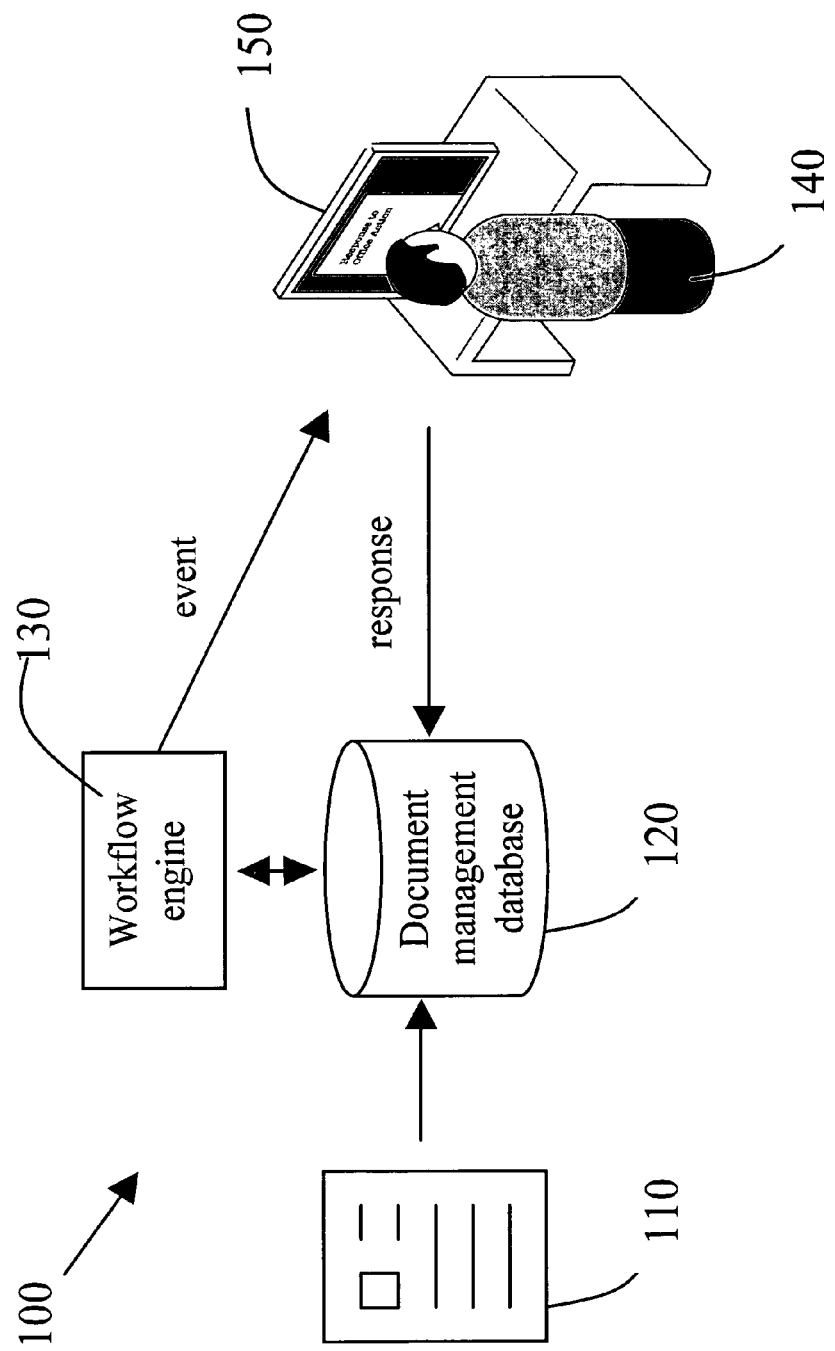
FIG. 1A is an abstract representation of a typical workflow and document management system of the prior art.

A system and methods for using Tokens to access electronic data are described below. The description of the present invention is in the context of a system for processing documents associated with patent prosecution and including a system for storing, accessing, presenting and creating tokens and patent prosecution related documents. The system is also responsive to events associated with the patent prosecution process. It will be apparent, however, to one skilled in the art that the invention can be practiced without these specific details, and patent prosecution is just an example of application of the principles of the present invention. In other instances, structures and devices are shown in block diagram form in order to avoid obscuring the invention. However, the present invention applies to any document system that has electronic documents such as medical document processing, legal document processing, administrative forms processing as may be used by governments, or any another document systems for another other purpose, and patent prosecution is only used here by way of example.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information or computing system. Such an information system as claimed may be an entire document management system or only portions of such a system. For example, the present invention can operate with an information system that need only be a database in the simplest sense to process and store electronic documents. Thus, the present invention is capable of operating with any information system from those with minimal functionality to those providing all the functionality disclosed herein.

Patent prosecution is an example of a paper-based work practice to which the Token system 200 of the present invention may be applied. The work of a typical patent prosecution attorney centers on collections of paper case files, often piled one on top of another in the attorney's work area.

Figure 1B:
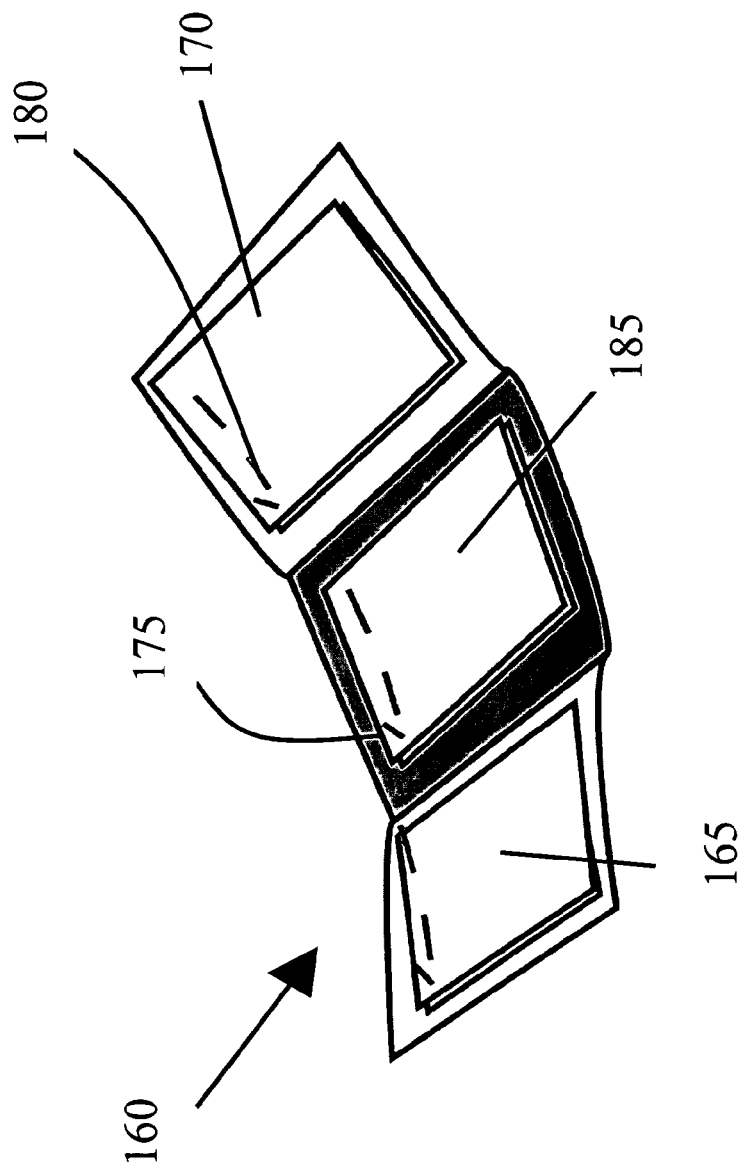
FIG. 1B is a graphical representation of an exemplary paper case file.

FIG. 1B is a drawing of a typical paper case file 160. A typical paper case file 160 includes a folder 175 that holds the paper documents for a case organized, for example, in three sections. The three sections may include, for example, communications with the client 165, communications with the U.S. Patent and Trademark Office (USPTO) 185, and drawings 170 for the case. The communications may be stacked in reverse chronological order and may be held in place with bendable tabs 180.

A major concern with this typical paper-based system is the ever-expanding size of the files 160 over time. A single file 160 can grow to hold more than 500 sheets of paper and weigh more than ten pounds. Security is another major concern. If a file 160 is lost or destroyed, serious ramifications to the firm and the client may result. A misplaced case file 160 can cause unnecessary delays in the prosecution process and lead to fees being assessed by the USPTO. Another shortcoming of such paper files is that they are difficult to search and time consuming to index.

On the other hand, an advantage of a paper-based document management system is the inherent physical workflow management it provides. Case files 160 are portable and can be easily passed from one individual to another as the status of the case changes. For example, an attorney may draft a response to an Office Action from the USPTO and then transfer the file 160 to an assistant to edit the response or file it with the USPTO. Individual users, such as attorneys, manage their queue of tasks by inspection and rearrangement of the piles of paper case files 160 in their work areas. "Piles" are a commonly used method for arranging items and correspond to tasks, order and priority of the user in handling the files.

System Overview

Figure 2:
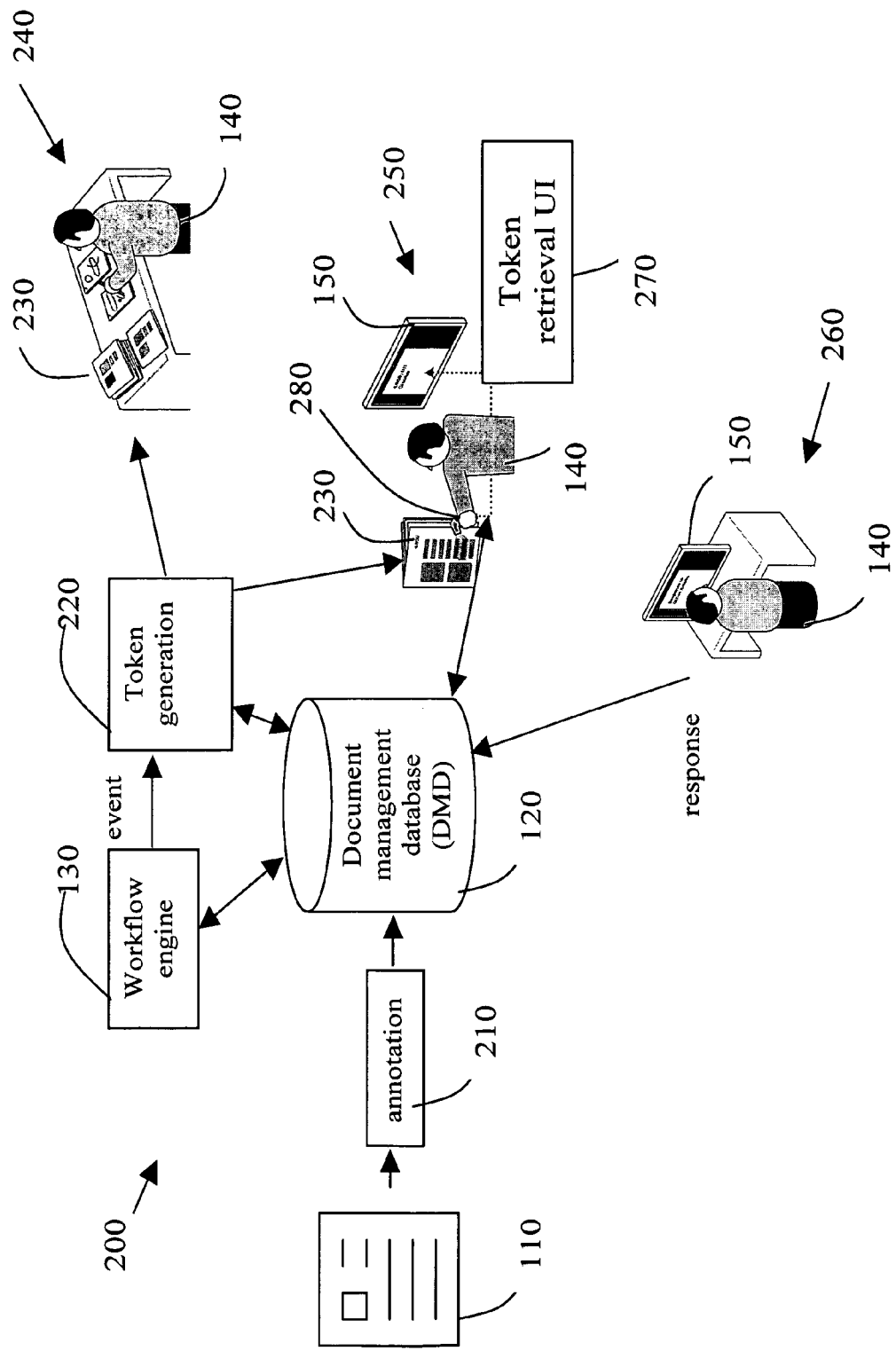
FIG. 2 is an abstract representation of one embodiment of a Token system including a Token interface.

FIG. 2 is an abstract representation of a Token system 200 of the present invention, which includes a Token interface. Documents 110 relevant to cases are input into a document management database (DMD) 120 through, for example, scanning or direct electronic generation. Documents 110 may include, for example, correspondences, essays, spreadsheets, images, or any item that may be scanned into an electronic file. The documents 110 may be passed through an optional annotation module 210 for annotating documents 110 as they are entered into the DMD 120 to attach meta-data, regarding either the case to which the document 110 pertains or the particular document 110 itself, to the record in the DMD 120. A Token generation module 220 includes a technique for generating a Token 230, for example, in response to an event affecting the case. The token generation module 220 receives information about a case from the workflow engine 130 and the DMD 120, including the case's identity, a list of all the documents in the case, the current state of the case, an event related to it, and a list of documents pertinent to the current state. The generated Tokens 230 provide a familiar mechanism to facilitate organization 240 of a user's 140 workflow through manipulation of the physical Tokens 230, retrieval and viewing 250 of documents 110 using the Token 230 and a retrieval user interface, and preparation of a response 260 to update the state of the case in DMD 120.

Token System 300

Figure 3A:
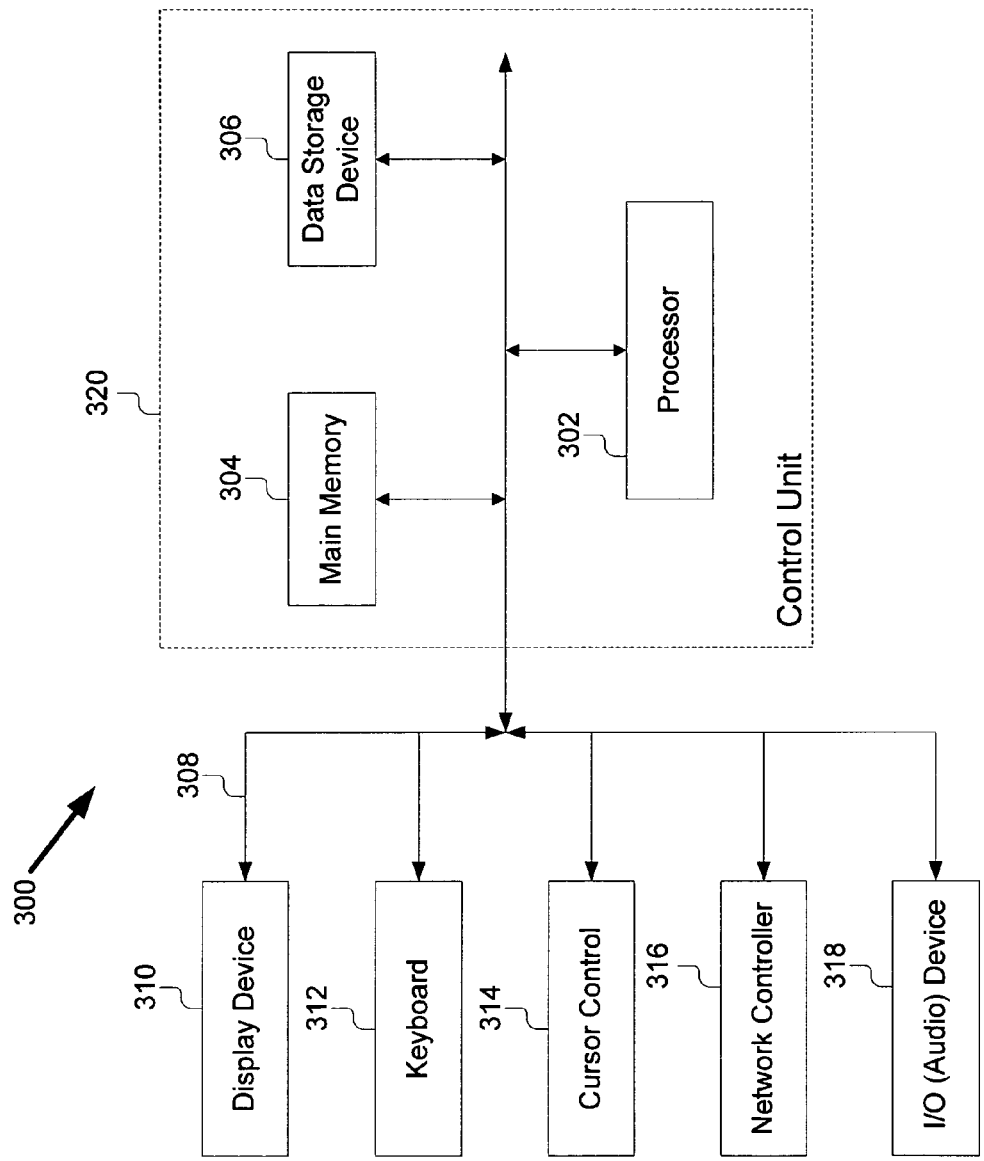
FIG. 3A is a block diagram of another-embodiment for the Token system of the present invention.

Referring now to FIG. 3A, another embodiment of the Token system 300 constructed according to the present invention is shown. The Token system 300 preferably comprises a control unit 320, a display device 310, a keyboard 312, a cursor control device 314, a network controller 316 and one or more input/output (I/O) device(s) 318.

Control unit 320 may comprise an arithmetic logic unit, a microprocessor, a general purpose computer, a personal digital assistant or some other information appliance equipped to provide electronic display signals to display device 310. In one embodiment, control unit 320 comprises a general purpose computer having a graphical user interface, which may be generated by, for example, a program written in Java running on top of an operating system like WINDOWS® or UNIX® based operating systems. In one embodiment, one or more application programs are executed by control unit 320 including, without limitation, word processing applications, electronic mail applications, financial applications, and web browser applications.

Still referring to FIG. 3A, the control unit 320 is shown including processor 302, main memory 304, and data storage device 306, all of which are communicatively coupled to system bus 308.

Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included.

Main memory 304 stores instructions and/or data that may be executed by processor 302. The instructions and/or data may comprise code for performing any and/or all of the techniques described herein. Main memory 304 may be a dynamic random access memory (DRAM) device, a static random access memory (SRAM) device, or some other memory device known in the art. The memory 304 is described in more detail below with reference to FIG. 3B. In particular, the portions of the memory 304 for providing token generation, token access to documents and token updating of the database will be described.

Data storage device 306 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage device 360 may include a database for storing documents electronically.

System bus 308 represents a shared bus for communicating information and data throughout control unit 320. System bus 308 may represent one or more buses including an industry standard architecture (ISA) bus, a peripheral component interconnect (PCI) bus, a universal serial bus (USB), or some other bus known in the art to provide similar functionality. Additional components coupled to control unit 320 through system bus 308 include the display device 310, the keyboard 312, the cursor control device 314, the network controller 316 and the I/O device(s) 318.

Display device 310 represents any device equipped to display electronic images and data as described herein. Display device 310 may be, for example, a cathode ray tube (CRT), liquid crystal display (LCD), or any other similarly equipped display device, screen, or monitor. In one embodiment, display device 310 is equipped with a touch screen in which a touch-sensitive, transparent panel covers the screen of display device 310.

Keyboard 312 represents an alphanumeric input device coupled to control unit 320 to communicate information and command selections to processor 302.

Cursor control 314 represents a user input device equipped to communicate positional data as well as command selections to processor 302. Cursor control 314 may include a mouse, a trackball, a stylus, a pen, a touch screen, cursor direction keys, or other mechanisms to cause movement of a cursor.

Network controller 316 links control unit 320 to a network that may include multiple processing systems. The network of processing systems may comprise a local area network (LAN), a wide area network (WAN) (e.g., the Internet), and/ or any other interconnected data path across which multiple devices may communicate. The control unit 320 also has other conventional connections to other systems such as a network for distribution of files (media objects) using standard network protocols such as TCP/IP, http, and SMTP as will be understood to those skilled in the art. The network controller 316 is used to couple the Token system 300 to a document management database 120, scanner or multifunction printers, and other computing systems.

One or more I/O devices 318 are coupled to the system bus 308. For example, the I/O device 318 may be a bar code reader equipped to emit light and receive input reflected from bar codes. Alternatively, the I/O devices 318 may be a microphone for input and transmit audio output via speakers. Optionally, I/O audio device 318 may contain one or more analog-to-digital or digital-to-analog converters, and/or one or more digital signal processors to facilitate processing.

It should be apparent to one skilled in the art that control unit 320 may include more or less components than those shown in FIG. 3A without departing from the spirit and scope of the present invention. For example, control unit 320 may include additional memory, such as, for example, a first or second level cache, or one or more application specific integrated circuits (ASICs). Similarly, additional components input/output devices 318 may be coupled to control unit 320 including, for example, image scanning devices, digital still or video cameras, or other devices that may or may not be equipped to, capture and/or download electronic data to control unit 320.

Figure 3B:
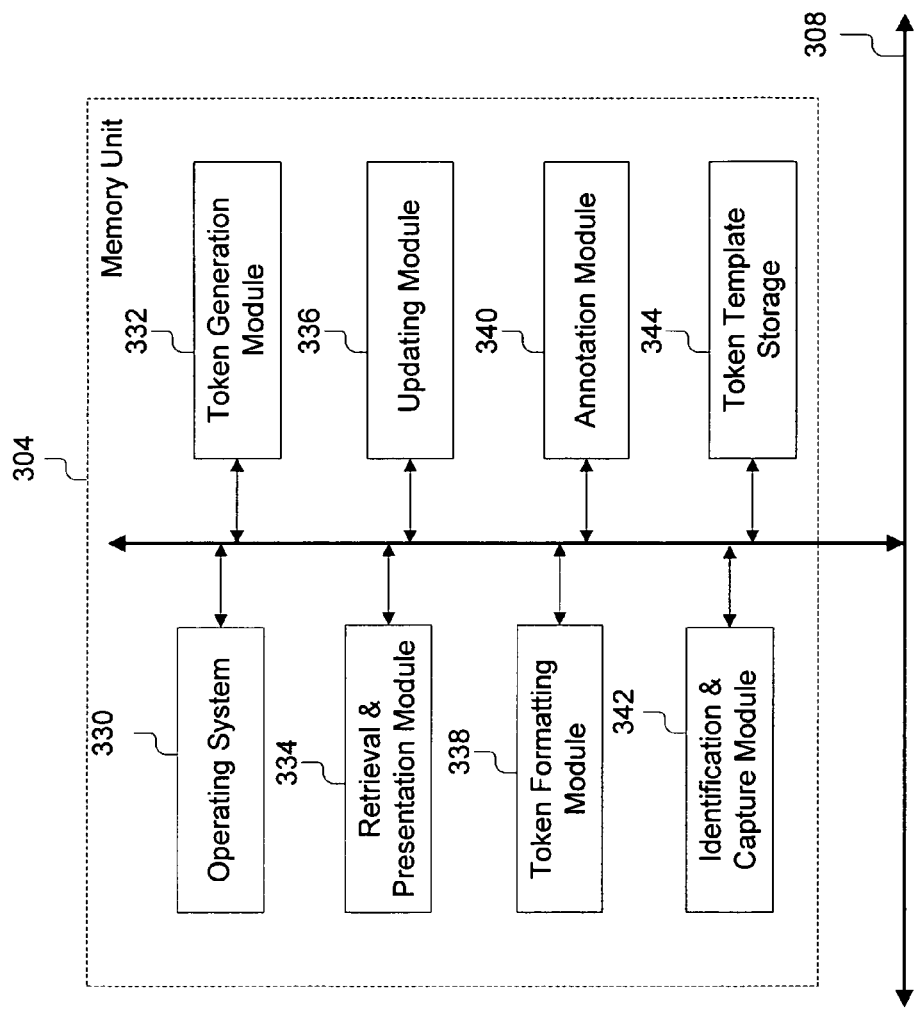
FIG. 3B is a block diagram of one embodiment for a memory of the Token system of FIG. 3A.

Referring now to FIG. 3B, the memory unit 304 is shown in more detail. In particular, the portions of the memory unit 304 needed for the generation and processing of Tokens 230 according to the present invention are shown and will now be described more specifically. As shown in FIG. 3B, the memory unit 304 preferably comprises: an operating system 330, a token generation module 332, a retrieval & presentation module 334, an updating module 336, a token formatting module 338, an annotation module 340, an identification & capture module 342 and storage for templates of tokens 344, all coupled for communication with each other and the control unit 320 by bus 308.

The operating system 330 is preferably one of a conventional type such as, WINDOWS®, SOLARIS® or LINUX® based operating systems. Although not shown, the memory unit 304 may also include one or more application programs including, without limitation, word processing applications, electronic mail applications, financial applications, and web browser applications.

The token generation module 332 is for generating tokens in accordance with the present invention. The token generation module 332 is responsive to input to the token system 300, and in response generates the appropriate token, and causes it to be printed. The token generation module 332 is coupled to the token template storage 344 to receive a template of the token to be produced. The token generation module 332 communicates with the identification & capture module to obtain the content for the token being generated, and with the token formatting module 338 to obtain information on the format for the token 230. The operations of the token generation module will be described in more detail below with reference to FIG. 11.

The retrieval & presentation module 334 is coupled to document management database 120 and responsive to the control unit 320. In response to input received from the control unit 320, the retrieval & presentation module 334 determines to which case the input relates, determines which document was requested by the user, and interfaces with the document management database 120 to retrieve an image of the document and present it on the display device 310 to the user. The operation of the retrieval & presentation module 334 will be described in more detail below with reference to FIG. 15.

The updating module 336 processes updates to the document management database 120. The control unit 320 is capable of receiving images as input. Such images may be of tokens that were generated by the token system 300 and then written upon, marked up or modified by a user, and then converted to a digital image. The updating module 336 receives such images, processes them by comparing them to the original token to identify a case to which they relate, and then modifies the information stored in the document management database 120. The updating module 336 interfaces with the document management database 120 either directly or indirectly and is capable of reading, writing and editing the document management database 120. The updating module 336 is also capable of translating mark ups or writing on tokens to actions/commands and information. The operation of the updating module 336 will be described in more detail below with reference to FIG. 18.

The token formatting module 338 works in conjunction with the token generation module 332. The token formatting module 338 prescribes the formatting for an identification number (e.g., a barcode), data, images, and other information that are printed as part of the token 230. Responsive to requests from the token generation module 332, the token formatting module 338 performs many of the steps necessary to organize and present the content that forms the token 230. The token formatting module 338 is also coupled to the token template storage 344 to retrieve information about the content and formatting needed for a particular token. The present invention preferably provides a plurality of different types or formats for tokens. Each is preferably pre-designed and contains content necessary for responding to a particular event, and is presented in a visually distinct manner such that the different types of tokens can be easily differentiated from each other. The operation of the token formatting module 338 will be described below in more detail with reference to FIG. 13.

The annotation module 340 works with the control unit 320 to augment the data in the document management database 120. In particular, the annotation module 340 can be used to add metadata for use by the token system 300. The operation of the annotation module 340 will be described in more detail below with reference to FIG. 16.

The identification & capture module 342 is coupled to the control unit 320, the token generation module 332 and the document management database 120. The identification & capture module 342 identifies the documents to be included as part of a particular token and retrieves the documents from the document management database 120. The identification & capture module 342 can also retrieve data from the document management database 120 which in turn is used by the token generation module 332. The operation of the identification & capture module 342 is described in more detail below with reference to FIG. 14.

The token template storage 344 is used to store templates for the different types of tokens. Such templates include an indication of the content to be presented as part of a token as well as the layout and formatting for the token. The type of content included can also be images, data, and sources from which to obtain data such as in the example in which the present invention is being described a database (not shown) of calendared deadlines related to a pending patent application.

Methods

Figure 10:
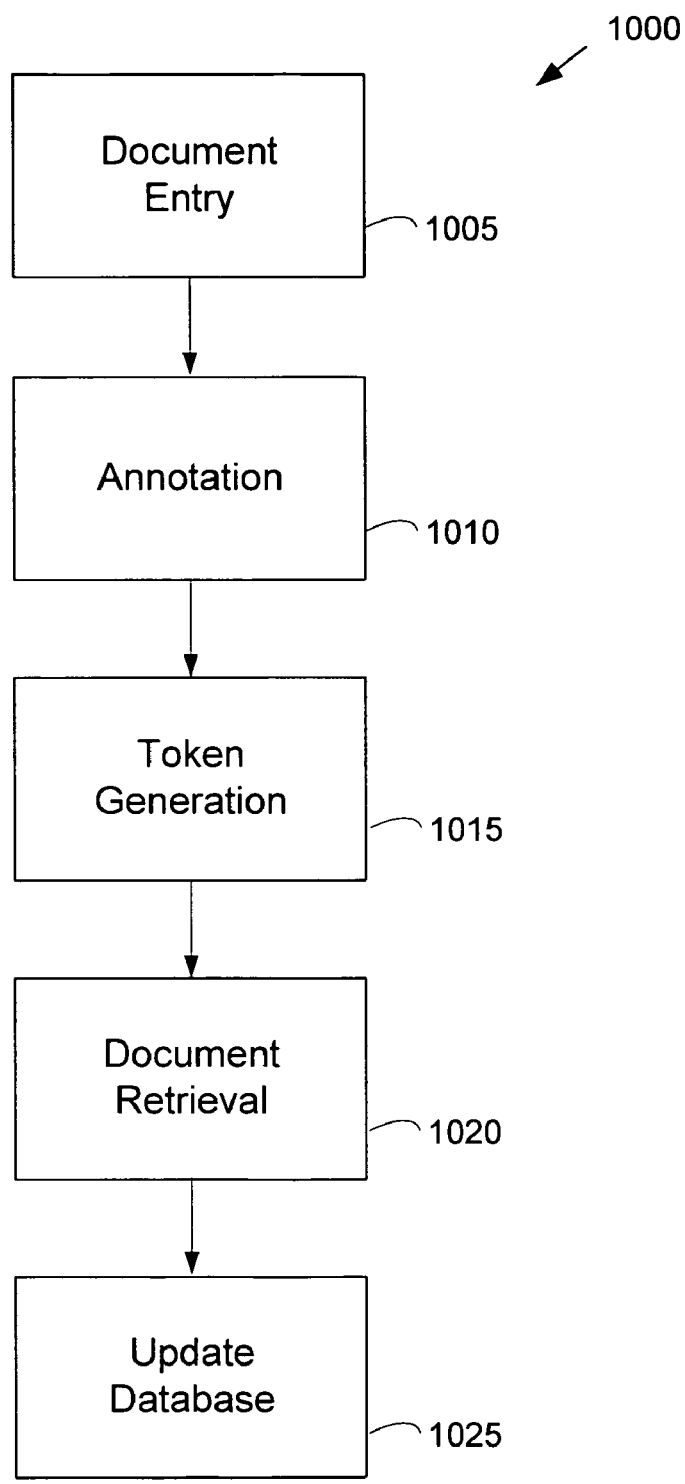
FIG. 10 is a flowchart of an exemplary embodiment for use of the Token system of FIG. 2.

FIG. 10 is a flowchart 1000 of an exemplary method for generating and using the Token 230 according to the present invention. The general method includes steps of document entry 1005, annotation 1010, Token generation 1015, document retrieval 1020, and updating 1025 the database 120. Each of these steps may be separated in time from each other and need not occur immediately following the previous step. Additionally, a user need not use all of the steps to use the Token system 200/300. For example, document entry 1005 may occur at any time, for example, following receipt of a correspondence, or generation of an electronic file. Annotation module 1010, is optional, as discussed above with respect to FIG. 2. The Token generation 1015 step may be triggered by document entry 1005, but it may also be initiated by a request from the user not associated with the document entry 1005 step. Document retrieval 1020 is also optional, and may be initiated through use of a Token, such as Token 230 in FIG. 2, as needed by a user. The step of updating 1025 the database 120 is also optional, and can be used for example, as a result of a response or action by the user, or as a result of a user making physical markings on a Token.

Figure 11:
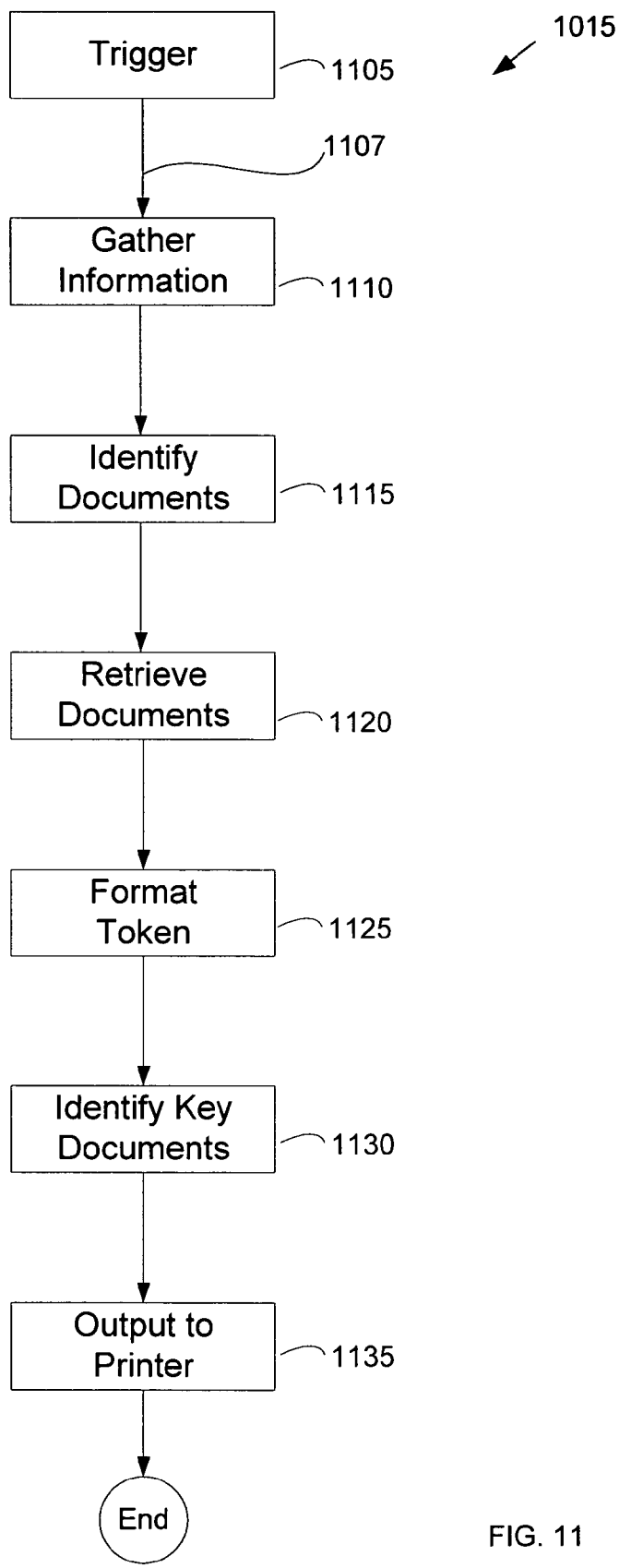
FIG. 11 is a flowchart of an exemplary embodiment for generation of a Token.
Figure 12:
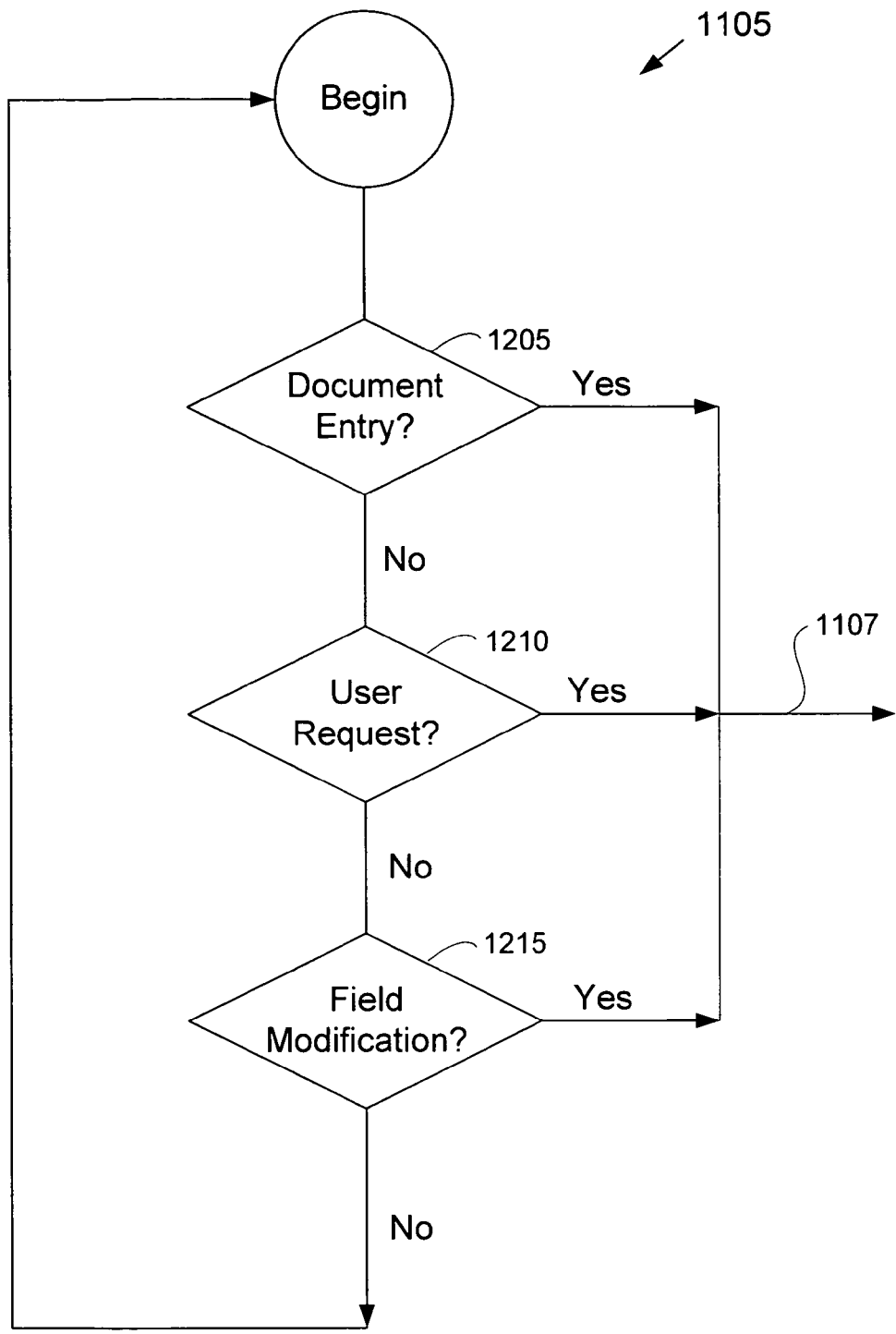
FIG. 12 is a flowchart of an exemplary embodiment of a method for triggering operation of the present invention.

FIG. 11 is a flowchart of an exemplary embodiment of the method for generating tokens. The process for generating tokens 230 is initiated by a trigger 1105. Referring now also to FIG. 12, an exemplary embodiment of triggers 1105 will be described. The Token generation process 1015 may be triggered by, for example, a document entry 1205 into database 120, a user request 1210, or a field modification 1215 of an entry in database 120. Those skilled in the art will recognize that there are a variety of other triggers that might initiate the Token generation 1015 process. Once a trigger has occurred, it is passed to the workflow engine 130, the document management database 120 and the Token system 300 for further processing as indicated by signal line 1107.

As shown in FIG. 11, once initiated, the Token generation module 332 gathers information 1110 from, for example, database 120 and workflow engine 130. Such information might include, for example, the case number or name, client information, upcoming deadlines, or other basic information. The Token generation module 332 also identifies 1115 documents 110 associated with the case and retrieves 1120 documents from database 120. This process is preferably done using a Token template corresponding to the trigger 1105 to which the Token system 300 is responding.

Once the documents 110 have been retrieved 1120, the Token generation module 332 cooperates with the token formatting module 338 to format 1125 the token and the identification & capture module 342 to identify 1130 key documents 1130, each discussed infra, and to send 1135 the output to a printer (not shown) for printing. Practitioners will appreciate that the modules described in this Token generation method are not exclusive and need not be performed in the order described.

Figure 13:
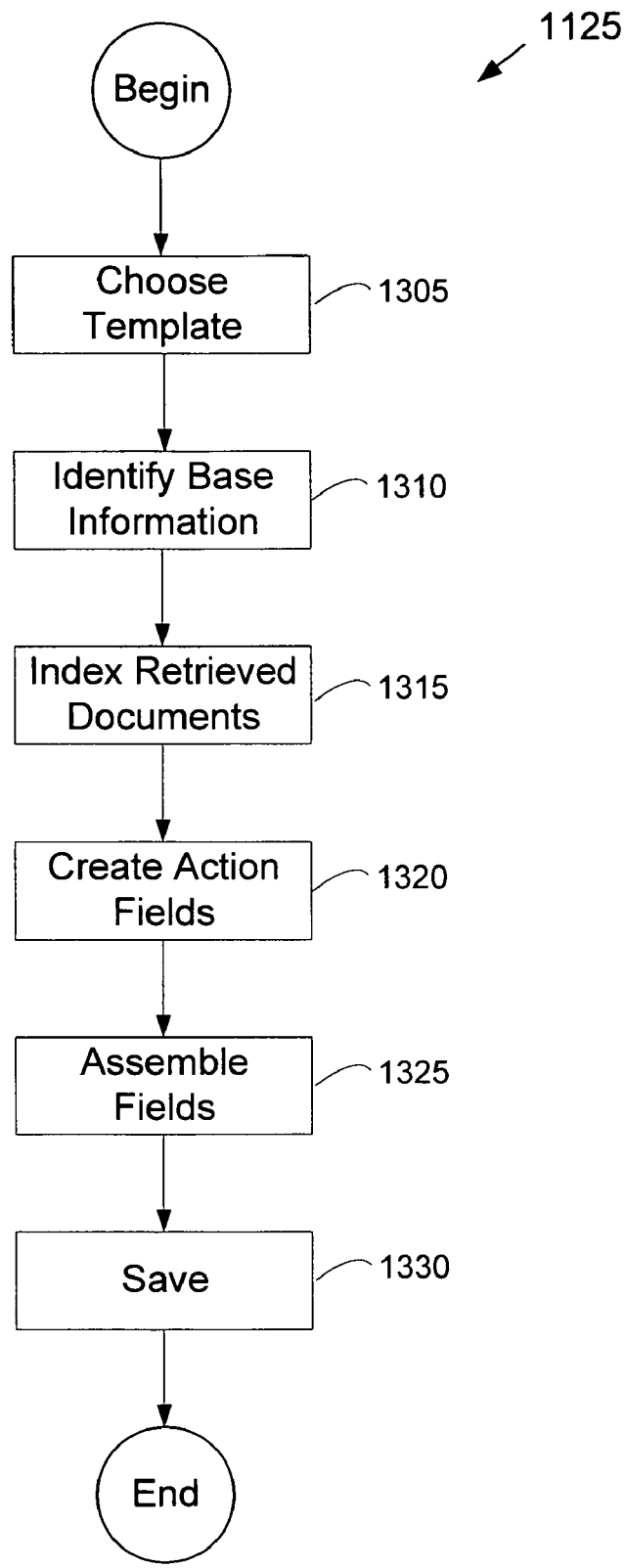
FIG. 13 is a flowchart of an exemplary embodiment of a method for formatting a Token according to the present invention.

Referring now to FIG. 13, a flowchart of an exemplary embodiment of the method for formatting 1125 a Token is shown. The process of formatting 1125 a Token 230 begins by choosing 1305 a template for the Token 230 from the Token template storage 344. The step of selecting 1305 a template may choose a format for the generated Token 230 from among several master templates available for each different type of case resident in the database 120. The database 120 may include several different types of cases, for example, medical cases, patent cases, financial cases, and others. Additionally, the master templates for each type of Token 230 may include all possible fields for a specific case, even though not all fields will necessarily be used every time a Token is generated. Types of fields may include, for example, case number, case name, client information, contact information, deadlines, correspondences, images, prognoses, user notes, user input fields, and other fields. The templates are user definable, and are preferably pre-defined based on user input.

Once a template has been selected 1305, the method identifies 1310 base information needed for the Token 230. The Token generation module 332 preferably sorts through the information gathered during the information-gathering step 1110 to identify basic information that is likely to be used. Such information might include, for example, case name or number, client name, Token identification number, and Token generation date. Alternatively, this basic information might be the minimum needed to identify the particular case.

Once the base information has been identified 1310, the Token generation module 332 creates an index of documents retrieved by the identification & capture module 342. Such documents are unlikely to be used as part of the generated Token either in part or in their entirety. One index entry is created for each document, and may include, for example, a document date, a document type, a short summary, and a link to the full version of the document.

Next, the action fields are created 1320. These action fields facilitate user entry of information onto the generated Token. Such fields include, for example, check boxes to allow a user to choose from among several options for a proposed action. Or, for example, in response to a received document, a user might be prompted to choose from among several predetermined actions that may be performed on the document.

Once the action fields have been created, the Token generation module 332 assembles the fields 1325 using a master template to generate the current Token and assembles the chosen fields to fit in a predetermined area. The predetermined area may be, for example, dictated by the size of the paper on which the generated Token is to be printed. The Token generation module 332 may then optionally save 1330 an electronic version of the generated Token prior to sending the Token 230 for output to a printer 1135 as shown in FIG. 11. If the generated Token is saved, a link to the electronic version of the Token may itself be provided on the generated Token. It should be understood that the steps of FIG. 13 are not exclusive and need not necessarily be performed in the order described.

Figure 14:
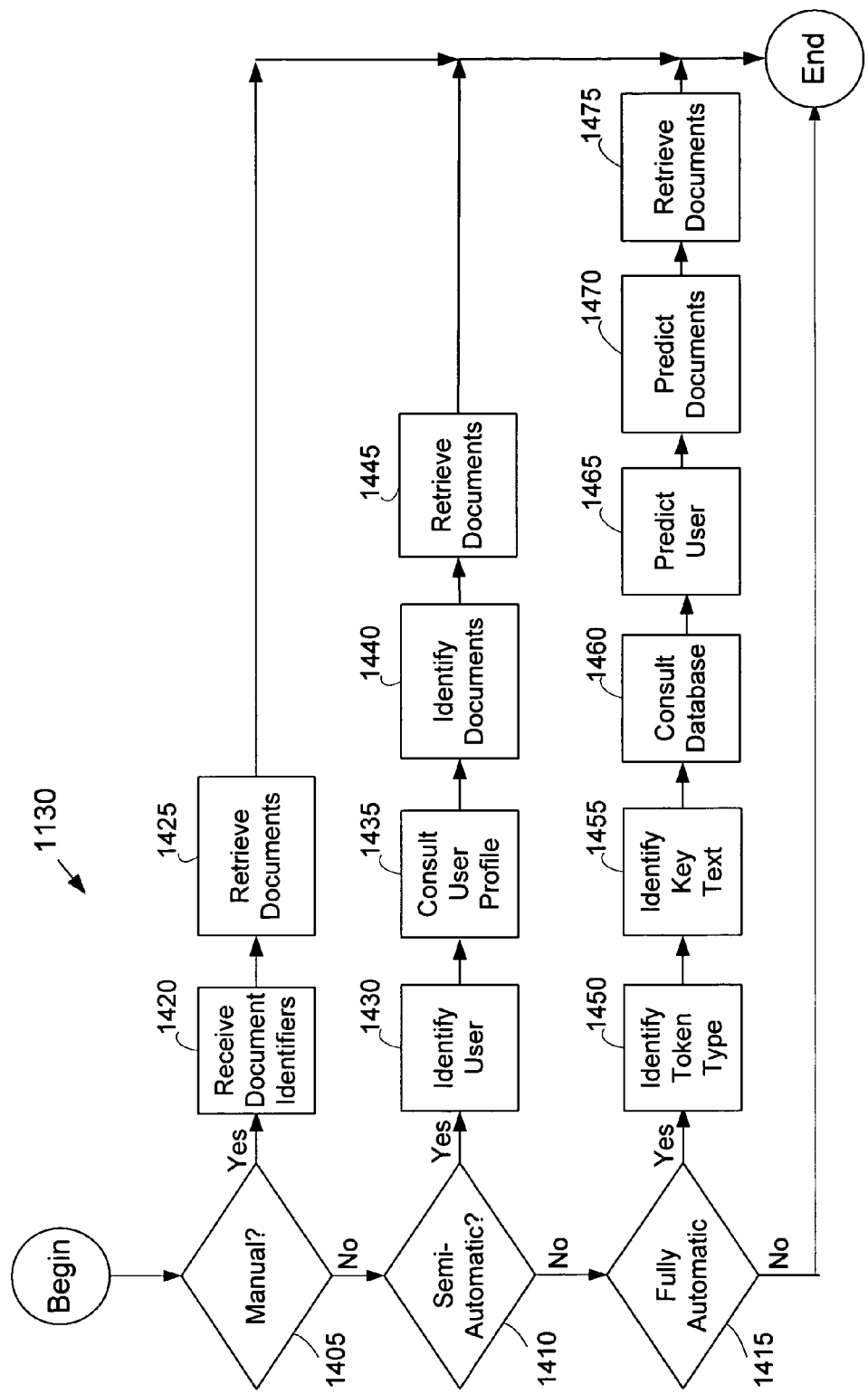
FIG. 14 is a flowchart of an exemplary embodiment of a method for identifying key documents according to the present invention.

Referring now to FIG. 14, an exemplary embodiment of a method for identifying 1130 documents to include as part of a Token 230 is shown. The identification & capture module 342 identifies documents that are to be printed as part of the Token 230. The identification & capture module 342 identifies documents based on a variety of factors including: user input, the template for the token, preset user preferences, the trigger that caused generation of the token, and the case to which the token is being created. Identification of which documents to include may occur, for example, by one of at least three methods: manual, semi-automatic, or fully automatic, with several different implementations possible for each method.

The method first determines 1405 if the manual method is being used to determine which documents are included as part of the Token 230. If the manual method is being used, the process continues in step 1420. Under manual identification, the identification & capture module 342 receives 1420 document identifiers and retrieves 1425 documents corresponding to those identifiers, for example, from database 120. This manual 1405 identification of key documents may be performed, for example, by an operator who knows the current status of a case, knows the event that has occurred, and understands which documents, possibly referenced on the generated Token, should be included as part of the generated Token 230 a user will use to prepare a response if needed. The simplest solution is to print every referenced document. This could result, however, in the printing of hundreds or thousands of sheets of paper, many of which might not be currently useful to the user. Instead, the operator preferably enters only those document identifiers for documents the user needs, for example, to prepare an appropriate response to the current event.

If the manual method is not being used, the method continues to step 1410 to determine if the semi-automatic method is being used. If so, under semi-automatic identification, the identification & capture module 342 identifies 1430 a user who will receive the generated Token and accesses 1435 a user profile for that user. The identification & capture module 342 identifies 1440 documents based on the profile and retrieves 1445 the documents, for example, from database 120. Semi-automatic 1410 identification of documents for the Token 230 leverages the observation that each user 140 has individual requirements for what documents 110 they like to have physically available when, for example, responding to an event. Thus, it should be recognized that the number of different type of tokens can be customized to the user's work style, or to enforce a company-work style can be part of the system 200/300. Some users 140, for example, may always want to see all of the documents 110. Other users 140, for example, may only want to see the current version of a main document and the most recent correspondence associated with the event when they prepare a response.

If the semi-automatic method is not being used, the method continues from step 1410 to step 1415 to determine if the fully automatic method is being used. If so, under fully automatic identification, the identification & capture module 342 identifies 1450 the token type. Identification of a token type can be based on the document that triggered the token generation, and a search of the document to identify 1455 key text using, for example, a parser. An electronic version of the document 110 may be directly searched, while the identification & capture module 342 applies optical character recognition (OCR) to obtain a textual representation of the image of a scanned document 110. The identification & capture module 342 uses the identified key text, and possibly the document type, to access 1460 the database and identify 1465 a user for the generated Token. Based on the user and key text, the identification & capture module 342 identifies 1470 documents to print and retrieves 1475 the documents from the database 120.

Under any of manual, semi-automatic, or fully automatic identification of documents to include as part of a Token 230, the identification & capture module 342 could cause the generation and printing of Tokens for any other cases related to the current case. For example, under manual identification, the step of receiving document identifiers may receive an identifier to a previously saved Token, or more likely, a user request 1210 for an up-to-date Token for a related case may be initiated as discussed with reference to FIG. 12. Under the semi-automatic or fully automatic identification modes, the identification & capture module 342 may similarly issue a user request 1210 to generate a related Token. The token generation module 332, however, might only print the Tokens specific to those related cases rather than also printing any documents associated with the related cases. Each Token for each related case would likely be used primarily as a reminder of the status of the particular related case but would also provide an easy access path to any documents referenced in the Token for the specific related case that the user 140 might wish to see.

As shown in FIG. 14, the identification & capture module 342 may not actually identify any extra documents to print, in which case, the Token generation module 332 generates only the Token. Those skilled in the art will appreciate that the steps described in FIG. 14 are not exclusive and need not necessarily be performed in the order described.

Figure 15:
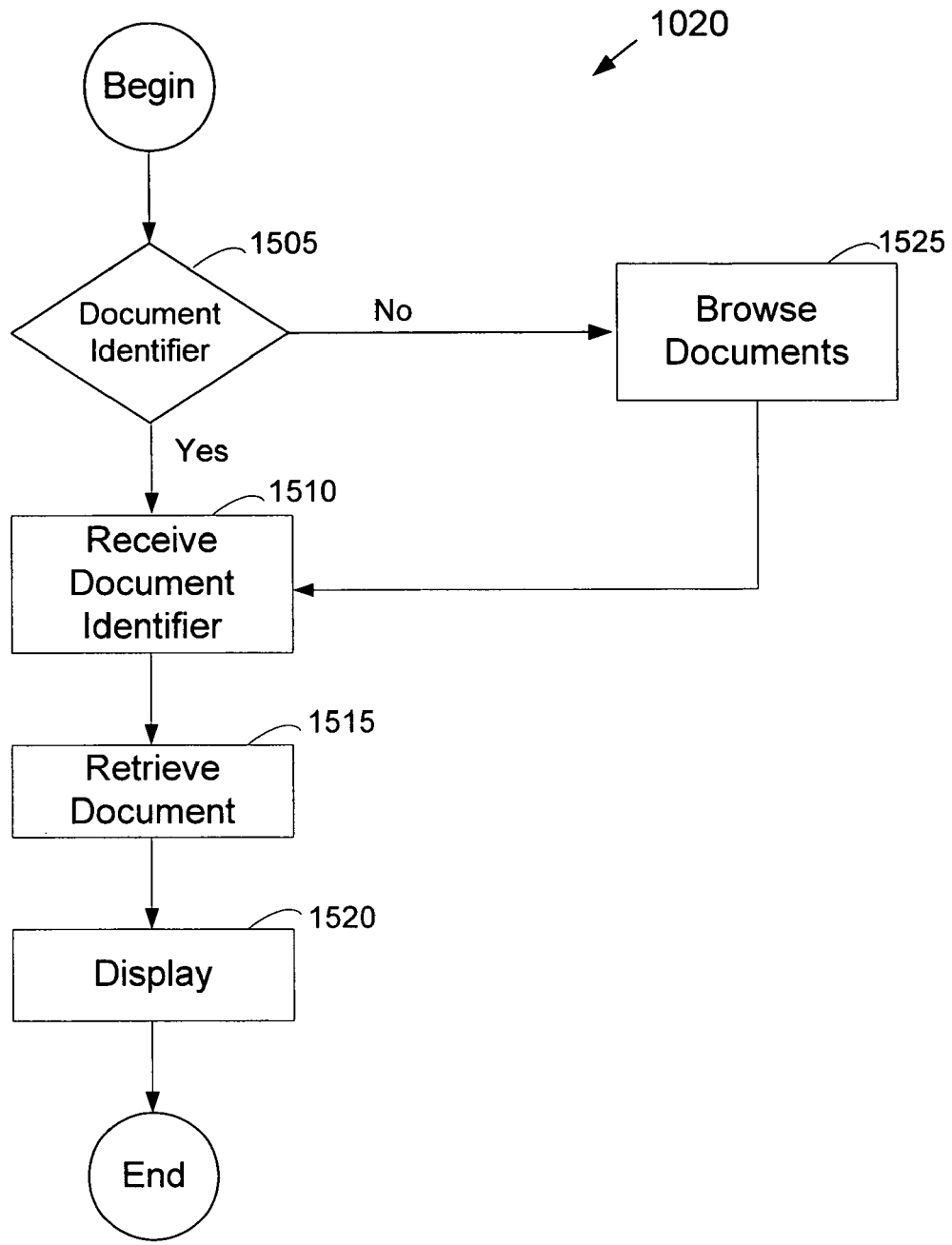
FIG. 15 is flowchart of an exemplary embodiment of a method for document retrieval according to the present invention.

As shown in FIG. 2, a Token retrieval user interface (UI) 270 may be implemented to facilitate retrieval and viewing 250 of documents 110 using the Token 230. FIG. 15 is flowchart of an exemplary embodiment of the method for retrieving a document in Token system 200/300 using a Token 230. The method is preferably performed using the retrieval & presentation module 334, and begins by determining 1505 whether a document identifier is available.

If a document identifier is available, the retrieval & presentation module 334 receives 1510 the document identifier. The Token retrieval user interface 270 allows retrieval of any document 110 associated with a case by, for example, scanning a bar code located on the Token 230. In this case, a bar code reader 280 could communicate with retrieval & presentation module 334 of FIG. 3B. Alternatively, the retrieval & presentation module 334 may receive 1510 the identifier through manual user entry of a code number, which could be a bar code, associated with the document 110, rather than scanning the bar code. The retrieval & presentation module 334 retrieves the document 1515 associated with the document identifier, for example, from database 120, and displays 1520 a viewable representation of the document 110 on the display device of the computer 150 as shown in FIG. 2. Alternatively, the retrieved document could be sent directly to a printer (not shown) by the retrieval & presentation module 334.

If a document identifier is not available in step 1505, the retrieval & presentation module 334 presents 1525 an interface to the user that can be used to browse documents for the case to which the token corresponds. This allows a user to select a document identifier by browsing the documents 110 associated with the case. Those skilled in the art will appreciate that the steps described above with reference to FIG. 15 are not exclusive and need not necessarily be performed in the order described.

As described with reference to FIG. 2, an optional annotation step 210 for annotating documents 110 as they are entered into the DMD 120 may also be implemented to attach meta-data, regarding either the case to which the document 110 pertains or the particular document 110 itself, to the record in the DMD 120. For example, the person who processes incoming mail may typically inspect it, log it in, make copies, and determine how it should be routed, effectively doing part of the job of the workflow engine 130. The annotation step 210 performed by the annotation module 340 can help ensure that documents 110 added to the database 120 are catalogued and associated with a particular case. A graphical user interface controls the annotation process.

Figure 16:
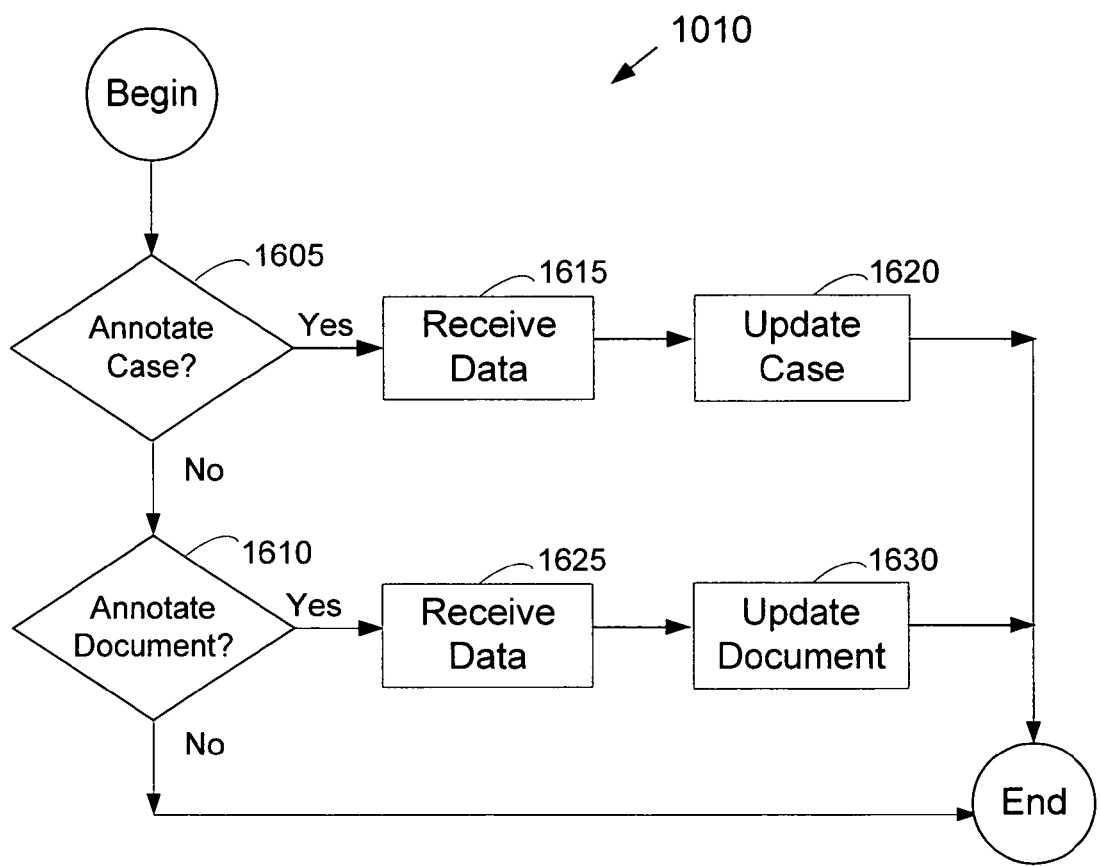
FIG. 16 is a flowchart of an exemplary embodiment of a method for making an annotation using the Token according to the present invention.

FIG. 16 is flow chart of an exemplary embodiment of the method for annotating documents according to the present invention. The annotation module 340 determines 1605 whether to annotate the case, to annotate 1610 the document, or not to annotate at all. If annotating the case, the annotation module 340 receives 1615 data and then updates 1620 one or more records in the DMD 120 corresponding to the case. For example, a user might enter basic meta-data regarding the case, such as its current status or case number. If annotating a document, the annotation module 340 receives 1625 data and then updates 1630 the document. For example, a user might enter basic meta-data regarding the particular document, such as its origin or classification. Those skilled in the art will appreciate that the process steps described for the annotation module 340 are not exclusive and need not necessarily be performed in the order described.

Figure 18:
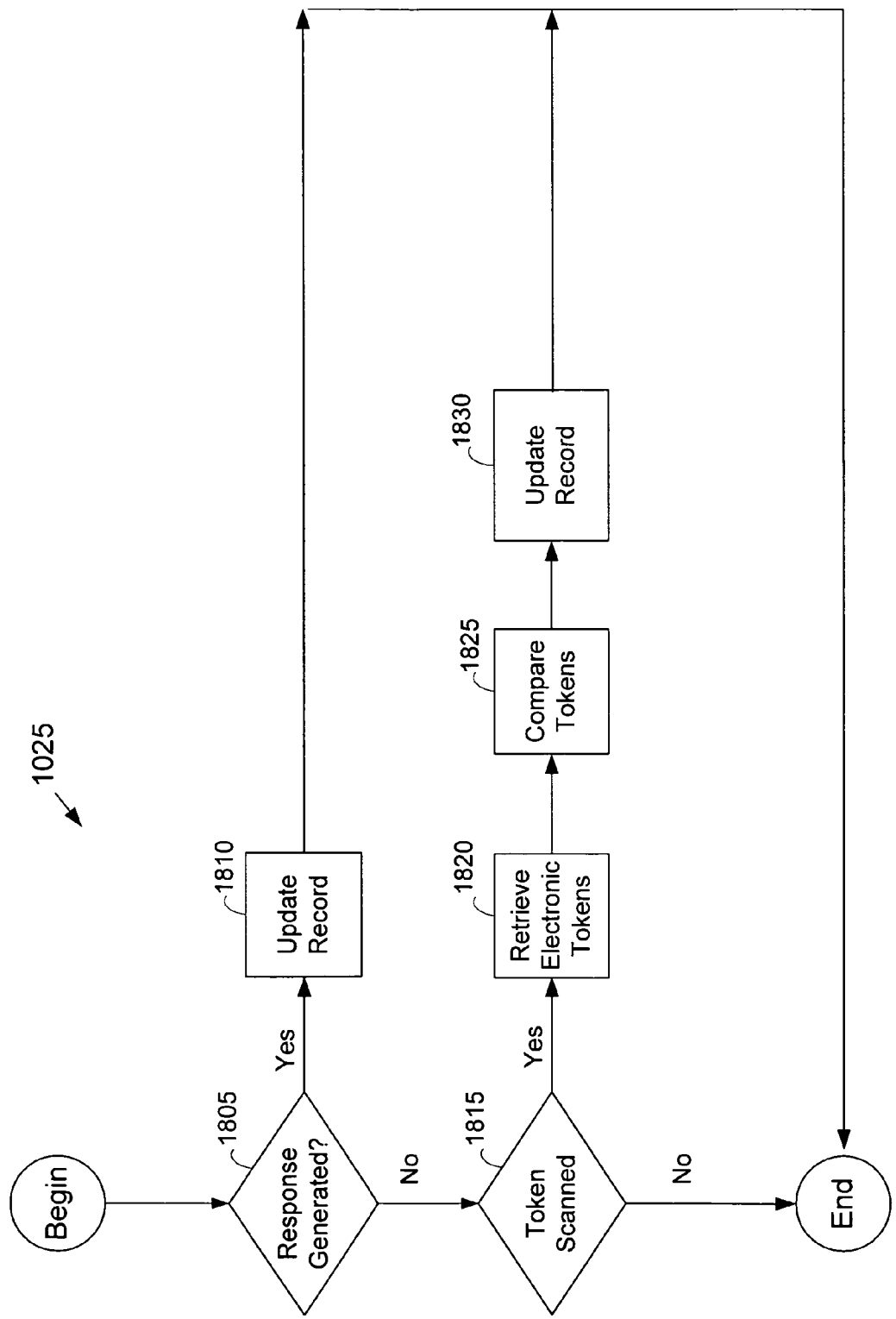
FIG. 18 is a flowchart of one embodiment of a method for inputting an image of a token and performing processing based on annotation to the Token.

FIG. 18 is flowchart of an exemplary embodiment of a method for updating 1025 the database 120 of the Token system 200/300. As indicated with reference to FIG. 2, the database 120 may be updated as a result of the preparation of a response 260 by a user, or, alternatively, as a result of a user making physical marks on a generated Token 230. The updating module 336 determines 1805 if a response was generated. If so, the updating module 336 updates the case record in database 120, using a process similar to that described to annotate the case and document described previously with respect to FIG. 16.

The updating module 336 may also determine if a Token was scanned 1815 into the system 200/300. If so, the updating module 336 retrieves an electronic version of the generated Token, saved by the token generation module 332, and the input scanned Token, marked by a user. The updating module 336 compares 1825 the electronic versions of the generated Token and the scanned Token to determine differences that may correspond to updates. Then the updating module 336 performs the updates to the documents and records in database 120 as mandated by the result of the comparison. Those skilled in the art will appreciate that the steps described are not exclusive and need not necessarily be performed in the order described.

Referring now to FIGS. 4-9, exemplary Tokens and user interfaces for use in with a token system 200/300 for managing and tracking the prosecution of patent applications and patents by attorneys and a patent office are shown.

Figure 4:
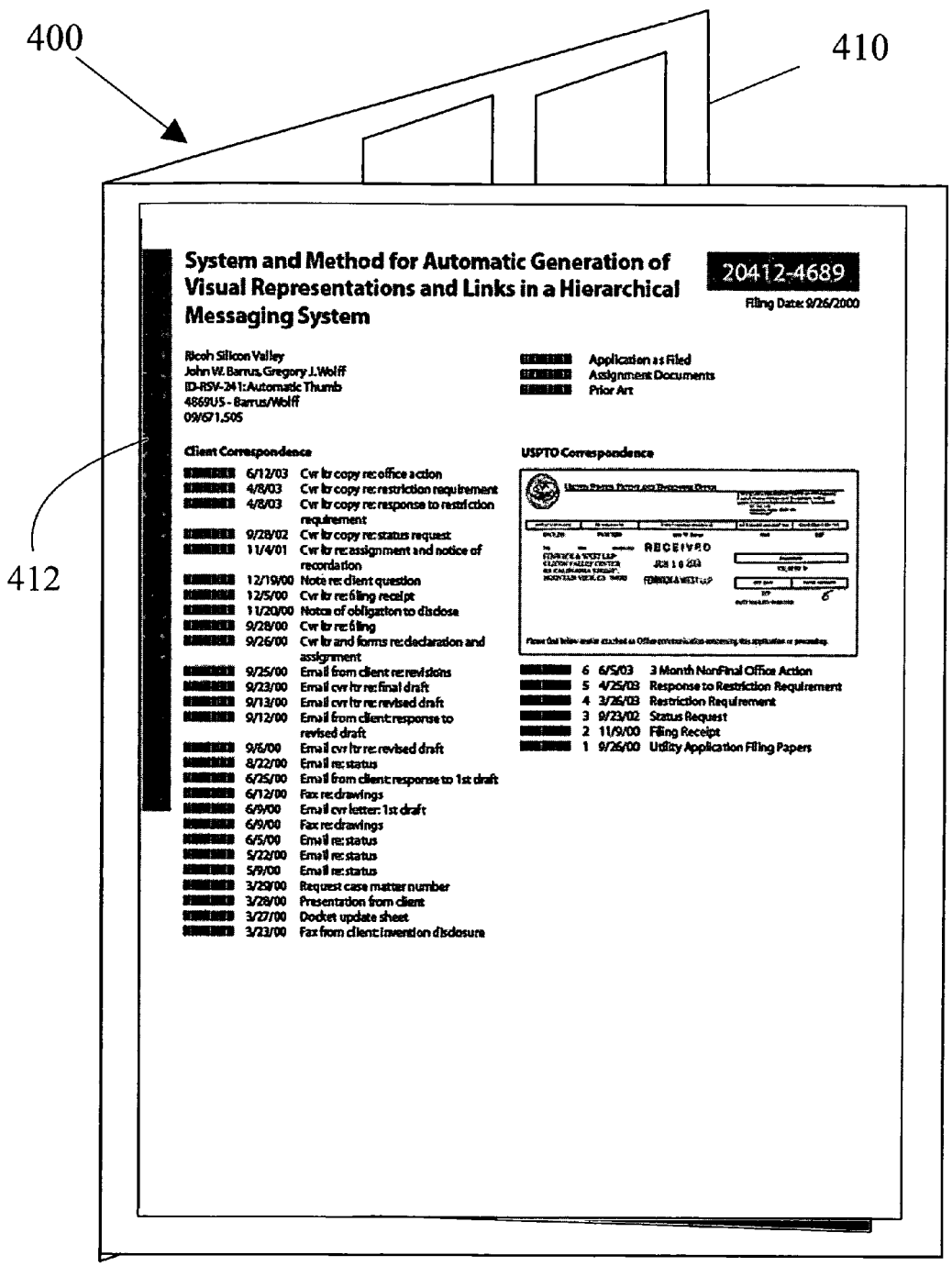
FIG. 4 is a graphical representation of an exemplary embodiment of a Token representing a paper case file of FIG. 3.

FIG. 4 is an exemplary embodiment of a Token 400 representing paper case file 160 (see FIG. 1B) used in patent prosecution. Token 400 may be printed, for example, on a sheet of 11"×17" paper 410 that is folded down the middle to create its own "folder." This is particularly advantageous in a number of respects. First, by folding the token in half, it creates a folder that may be used as a file for other separate sheets of documents that are printed as part of the token. Second, a portion of the spine 412 of the folded token may color code to indicate the status of the case. Third, standard information may be printed and color-coded in the upper portion of the first page.

Figure 5A:
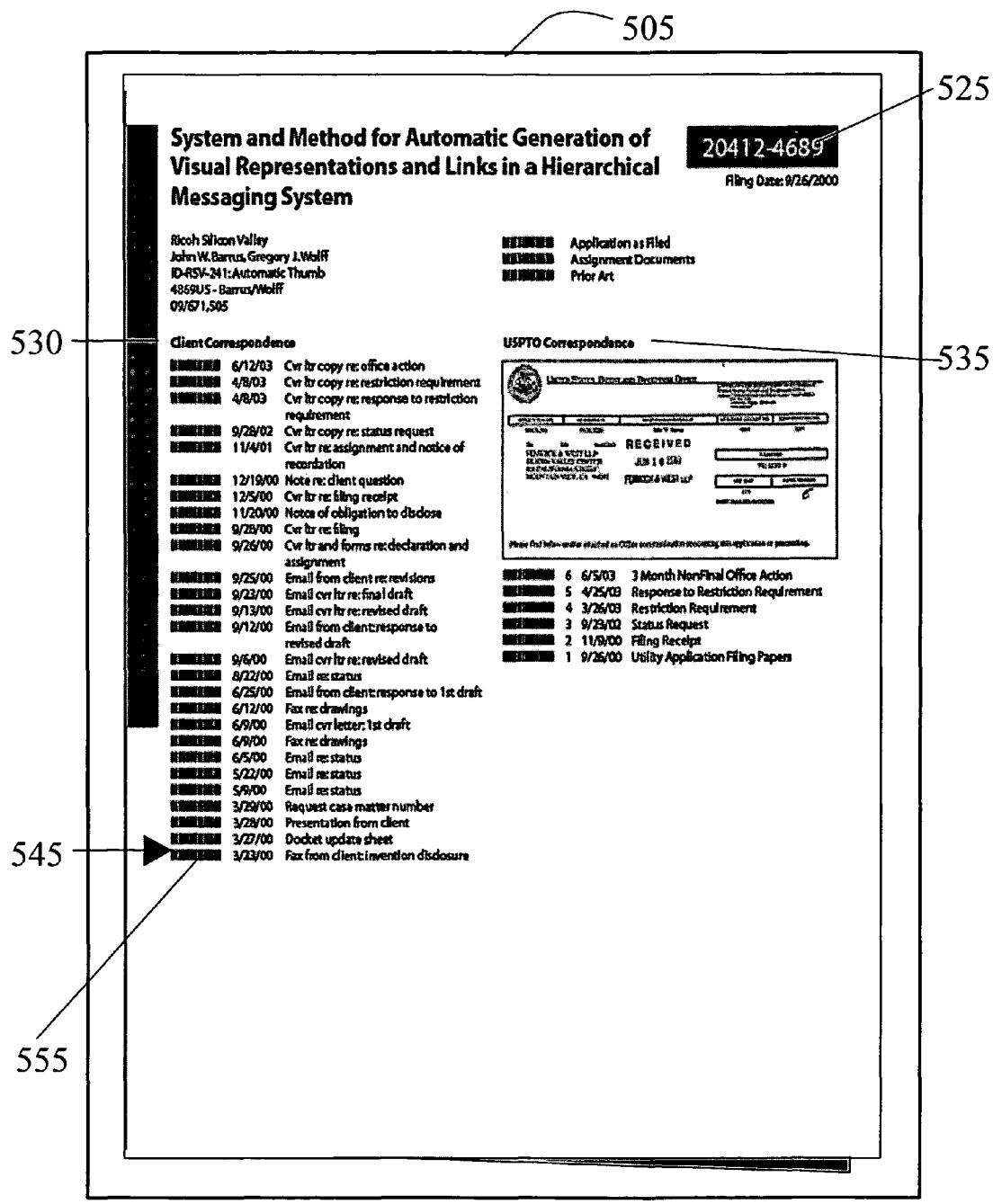
FIG. 5A is a graphical representation of an exemplary representation of the cover page of the Token of FIG. 4.

FIG. 5A is an exemplary representation of a cover page 505 of the Token 400 of FIG. 4. The cover page 505 of Token 400 shows an identification number 525 for the case in the upper right corner, a list of the client correspondence 530, and a representation of the correspondences 535 from the USPTO. Both categories of correspondence 530 and 535 include a textual summary 540 of each item 545 of correspondence, a correspondence date 550, and a bar code 555. Each item 545 of correspondence corresponds to a document 110 entered into a document management database 120. The bar code 555 of each item 545 of correspondence links to the item's 545 electronic representation in the document management database 120. Although not shown, the token 400 may also have a bar code identifying and corresponding to the electronic version of the token 400.

Figure 5B:
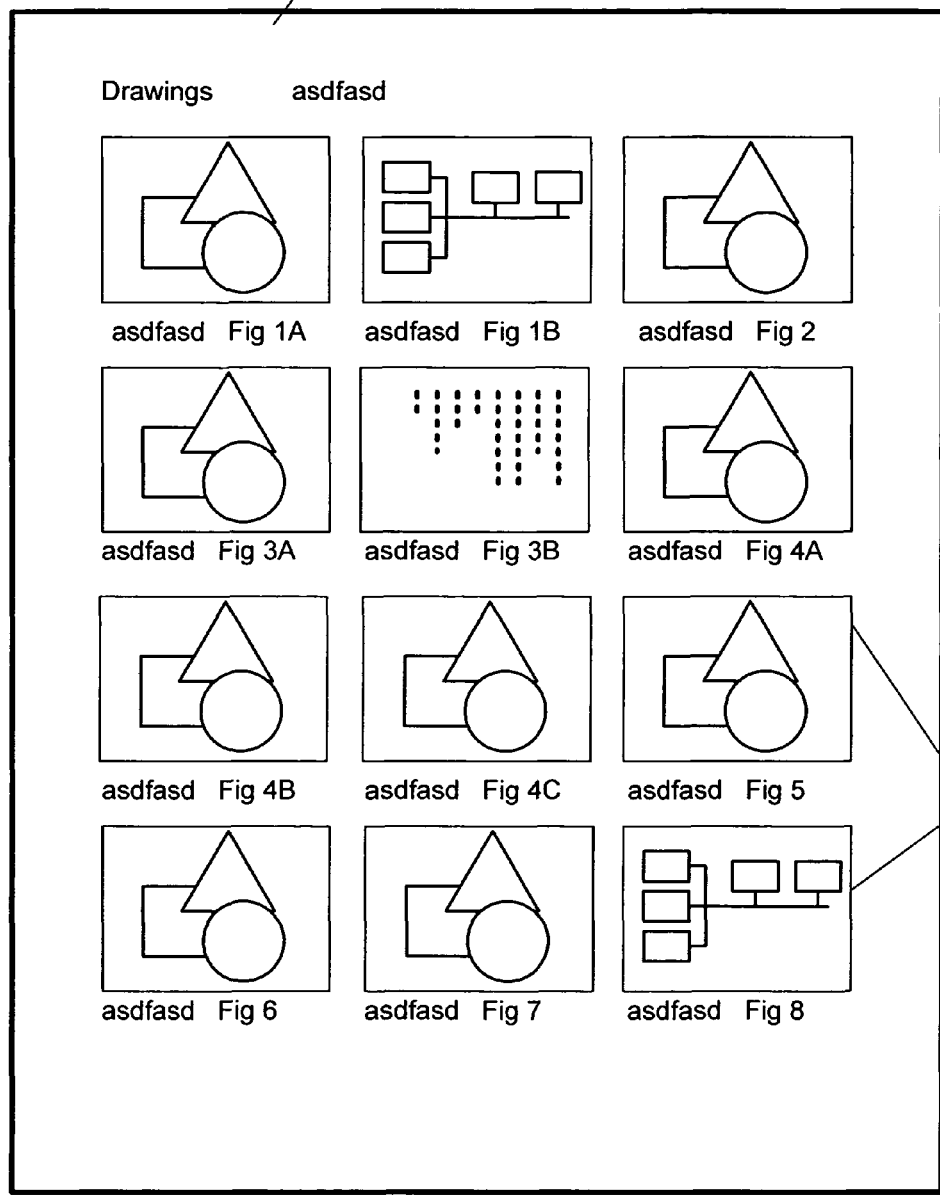
FIG. 5B is a graphical representation of an exemplary representation of an interior page of the Token of FIG. 4.
Figure 5C:
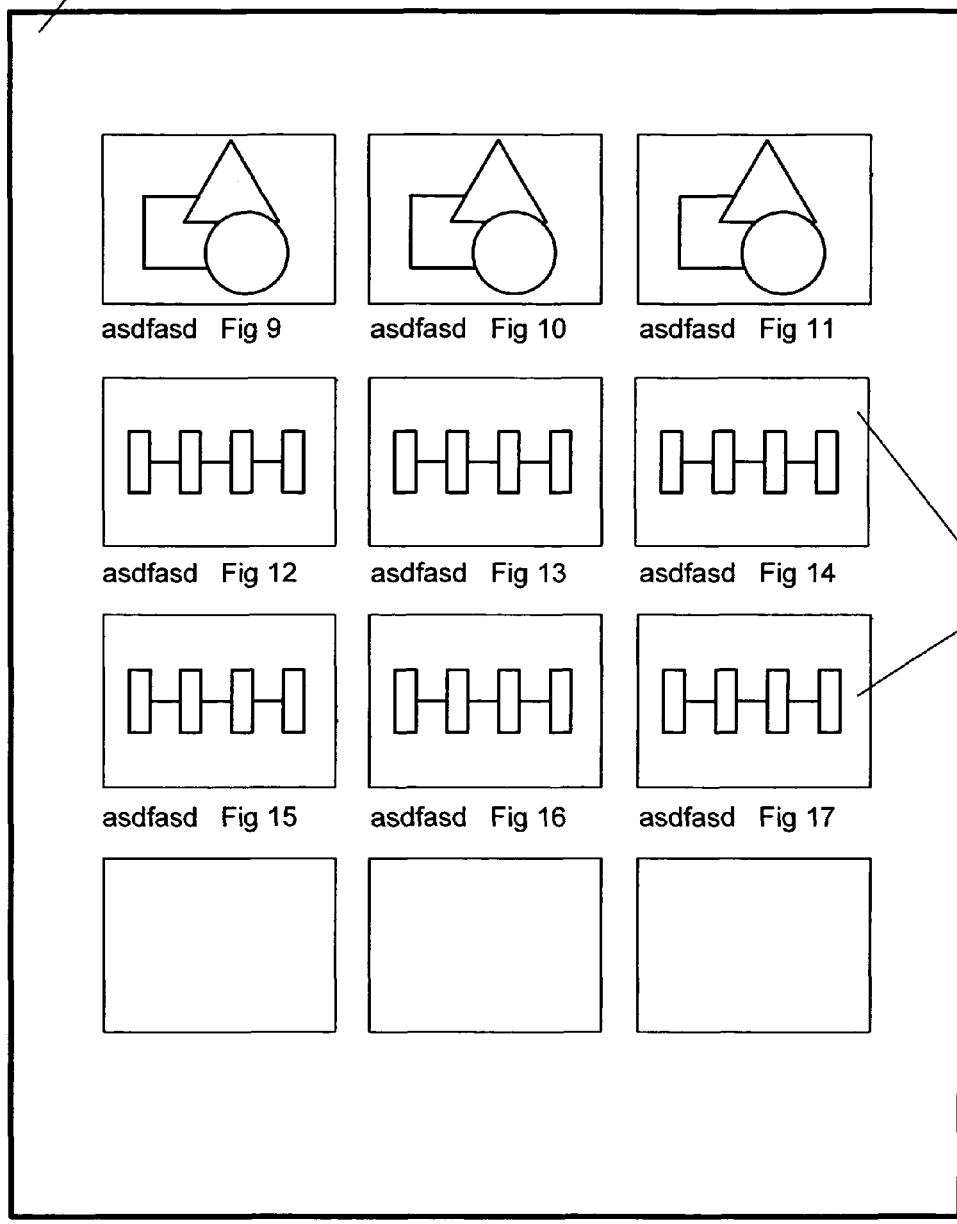
FIG. 5C is a graphical representation of an exemplary representation of another interior page of the Token of FIG. 4.
Figure 5D:
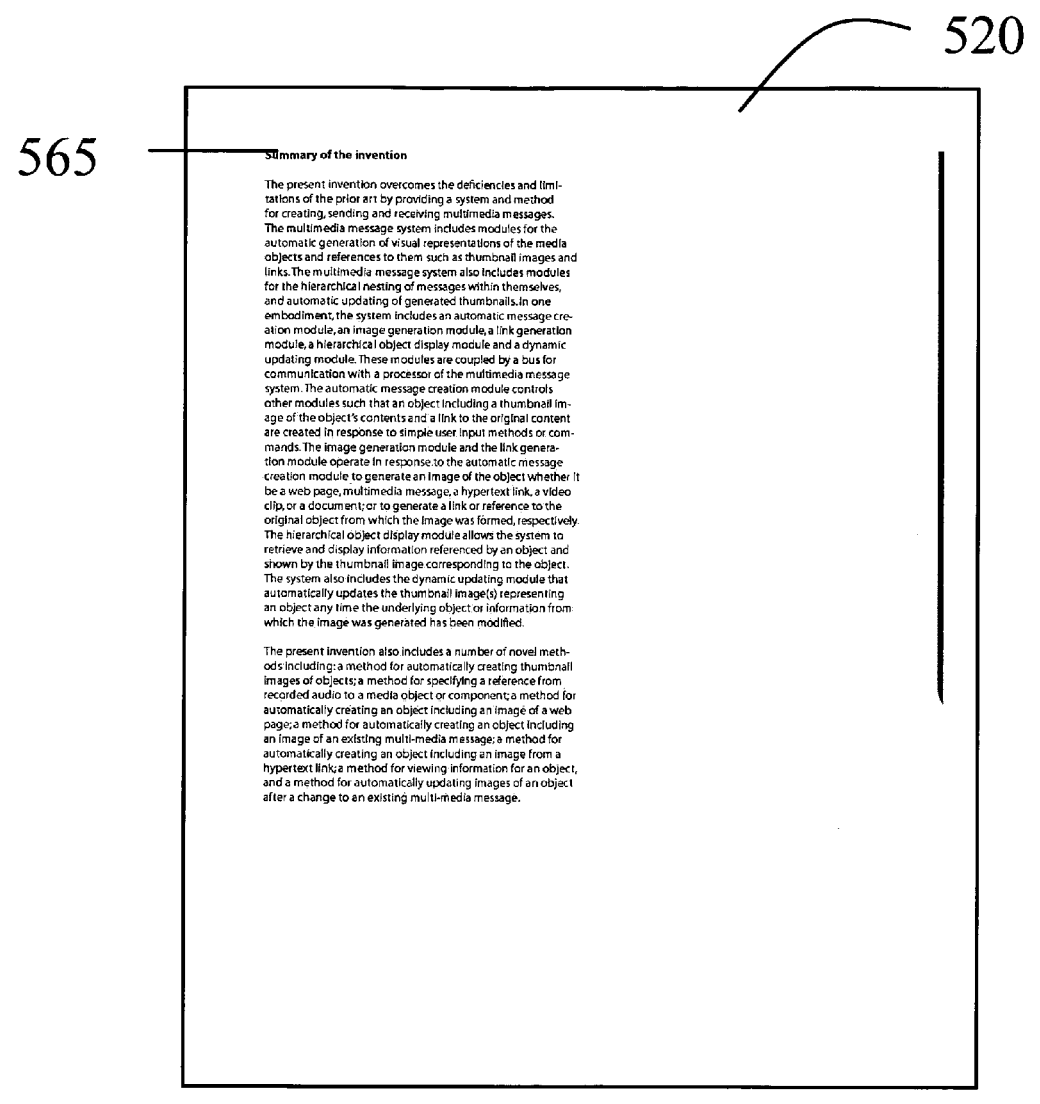

FIG. 5B is an exemplary representation of a left interior page 510 of the Token 400 of FIG. 4. FIG. 5C is an exemplary representation of a right interior page 515 of the Token 400 of FIG. 4. In this embodiment, left interior page 510 and right interior page 515 of Token 400 show thumbnail images of figures 560 that were previously prepared for the case. FIG. 5D is an exemplary representation of the back page 520 of the Token 400 of FIG. 4. In this embodiment, back page 520 of Token 400 shows a summary of the invention 565. Of course, the contents of each page of Token 400 are not limited to those embodiments shown in FIG. 4 and FIGS. 5A-5D, but may be modified to include the information deemed most appropriate by the users 140 of the Token system 200/300.

Token 400 of FIG. 4 and FIGS. 5A-5D may be generated as discussed previously with respect to FIGS. 11 to 13. The Token generation process may also retrieve and print a subset of documents represented by items 545, indexed in the representations of the client and USPTO correspondences 530 and 535 on cover page 505 of FIG. 5A, that are helpful to an attorney in preparing a response to the pending event. This subset may be generated manually, semi-automatically, or fully automatically, as discussed with respect to FIG. 14.

Under manual generation, an operator (e.g., an assistant to an attorney), could facilitate printing of those documents represented by items 545 referenced on Token 400 and needed by the attorney. Under semi-automatic generation, a profile associated with each attorney would guide determination of the subset of items 545 to print. For example, some attorneys may always want to see all documents represented by items 545. Other attorneys may only want to see the current claim set and the most recent Office Action to prepare a response to that Office Action. Under fully automatic generation, a parser might identify a document associated with a current event as, for example, an Office Action. The Token generation module 332 of the Token system 200/300 could print, for example, only the patents referenced in the Office Action and order the printouts by the order in which they are referred to in the Office Action, rather than simply printing all of the patents in the Reference List attached to the Office Action.

The Token generation mechanism 220 of FIG. 2 could also generate Tokens similar to Token 400 of FIG. 4 for other patent cases related to the current case. Since the attorney handling the current case primarily requires only documents referred to in the current Token 400, documents referenced in related Tokens would generally not be printed.

Figure 6:
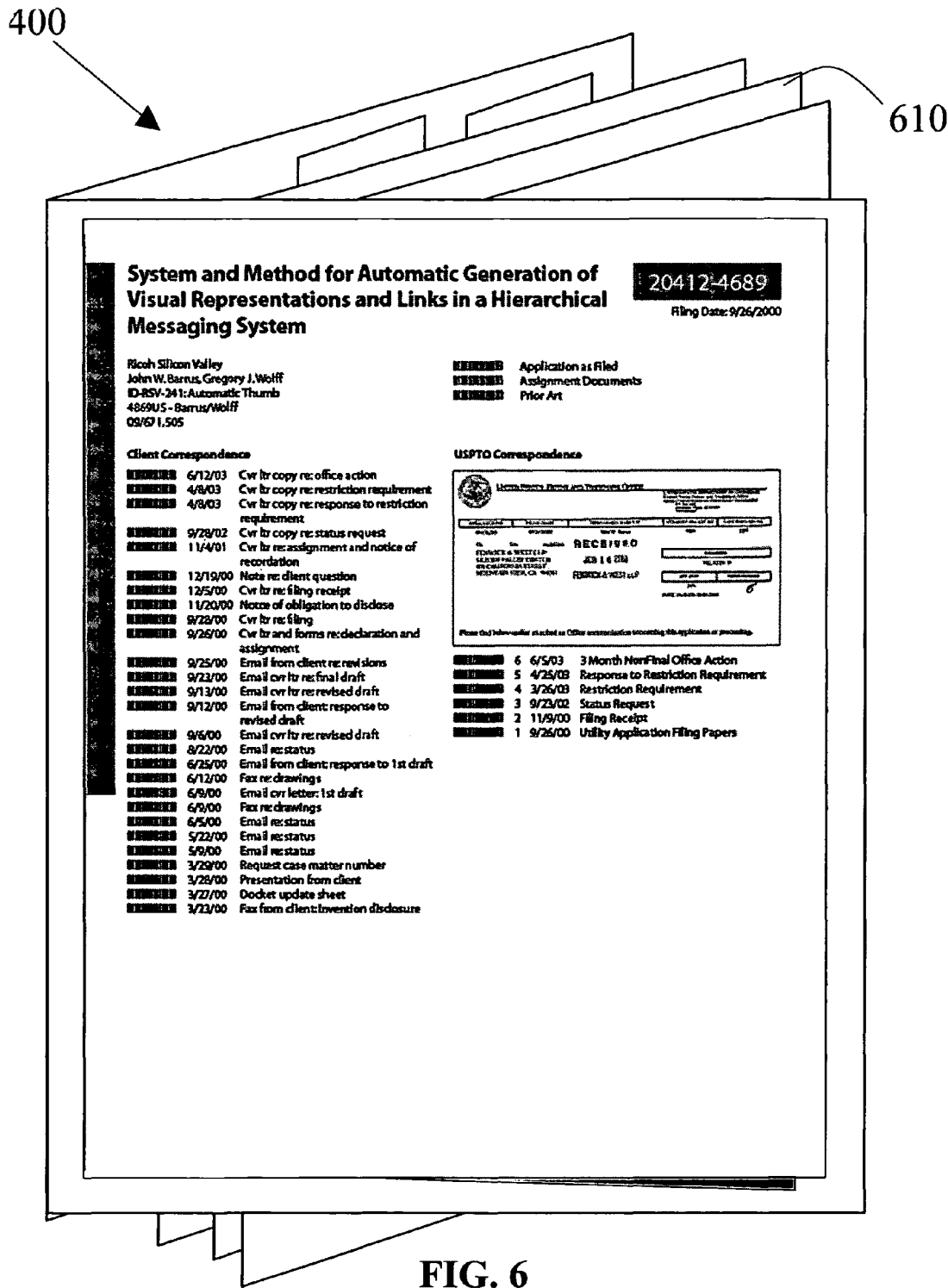
FIG. 6 is a graphical representation of a second embodiment of the Token of FIG. 4 including a printout of an associated document as part of the Token.

Any printouts of documents represented by items 545 of FIG. 5A or related Tokens generated by the Token generation mechanism 220 of the system 200/300 may be tucked inside the Token 400 for the current case, or attached to the Token 400 by, for example, a paper clip or binder clip. FIG. 6 is the Token 400 of FIG. 4 including a printout 610 of an associated document (e.g., a document 110 as shown in FIG. 2) tucked inside the Token 400.

Figure 7A:
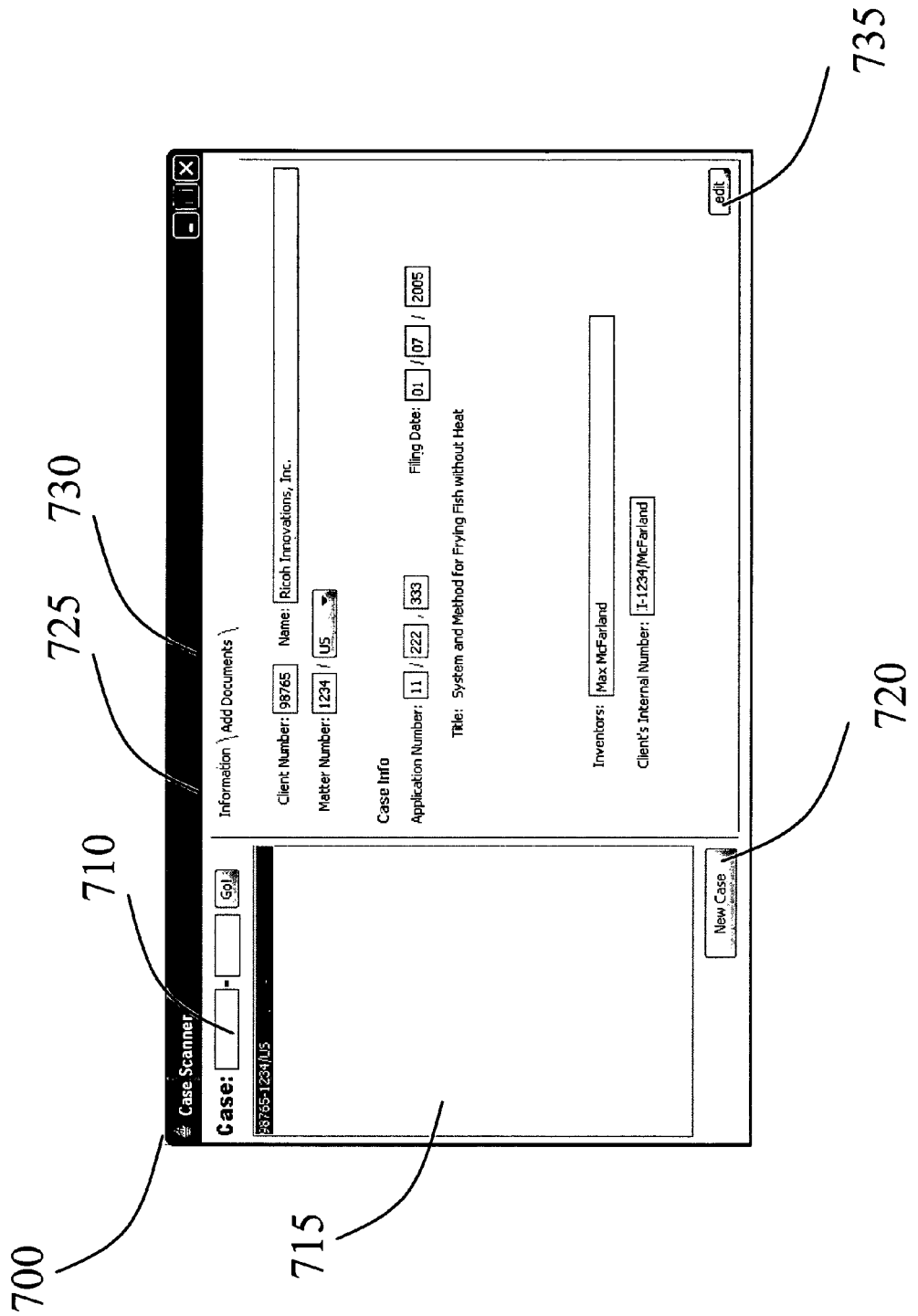
FIG. 7A is an exemplary graphical representation of a user interface used to enter meta data for a case to which the current document pertains.
Figure 7B:
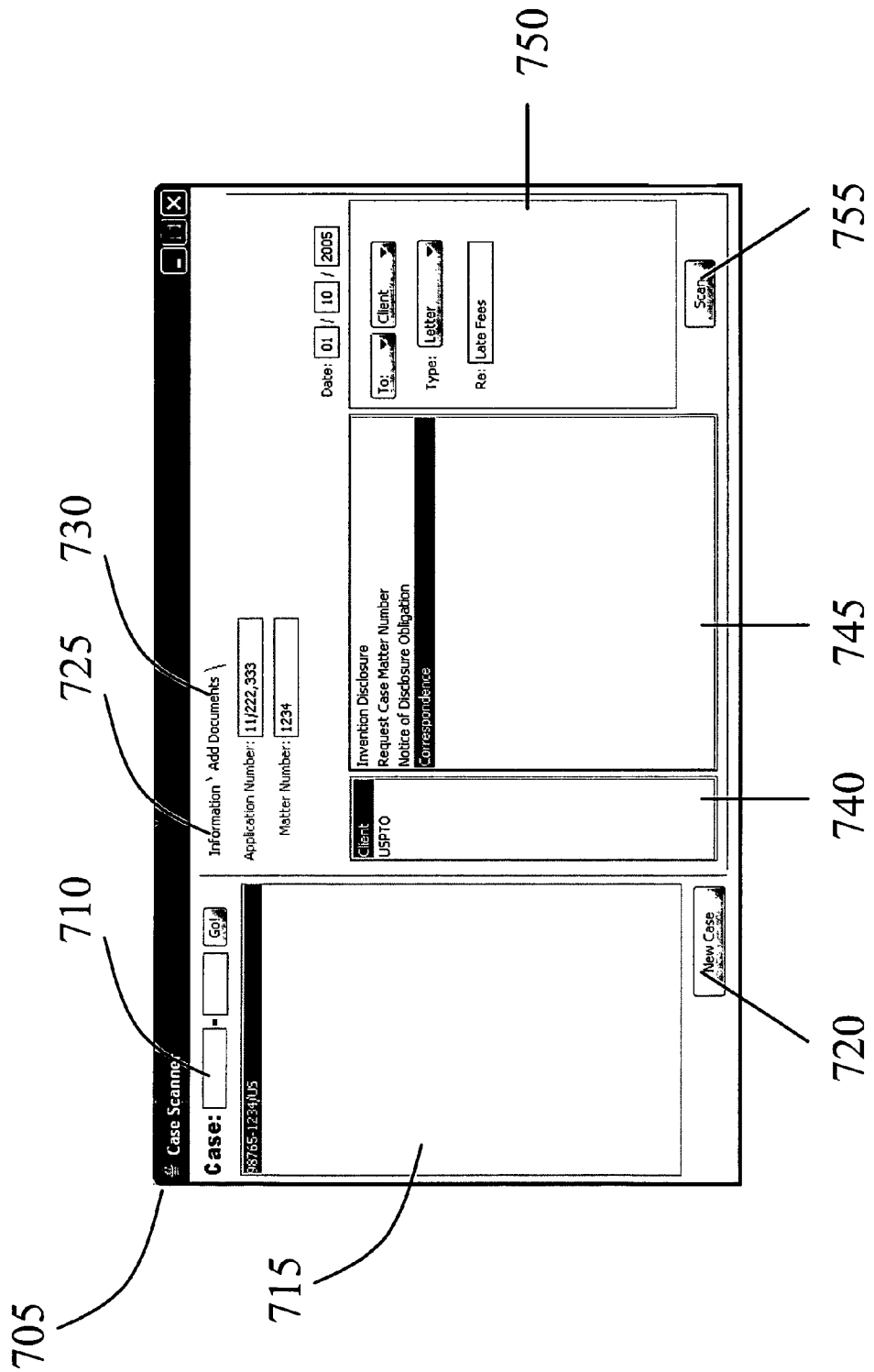
FIG. 7B is an exemplary graphical representation of a user interface used to generate an image of a document and store it in the system of the present invention.

FIG. 7A is an exemplary representation of a user interface 700 used to enter meta data regarding the case to which the current document (see, e.g., document 110 of FIG. 2) pertains. FIG. 7B is an exemplary representation of a user interface 705 used to enter meta data regarding the document (see, e.g., document 110 of FIG. 2) itself. As discussed previously with respect to FIG. 2, an optional annotation step 210 may be implemented to attach meta data to documents 110 entered into database 120. In the context of patent prosecution, the annotation step is controlled via Case Scanner user interfaces 700 and 705.

As shown in FIG. 7A, the first user interface 700 used to enter meta data regarding the case to which a particular document pertains includes a search field 710, a case list field 715, a New Case button 720, an Information tab 725, and an Add Documents tab 730. The search field 710 allows a user, such as an attorney, to retrieve the meta data for a particular case. The case list field 715 may list, for example, recently accessed cases or cases associated with a particular client. The New Case button 720 opens a new window to allow data entry for a new case. Information tab 725 shows meta data regarding the case, which might include, for example, the Client Number, client Name, Matter Number, Application Number, Filing Date, Title, Inventors information, and the Client's Internal Number for the case. Meta data in boxed fields may be edited using edit button 735. The Matter Number may include a drop down menu to select from among various country codes. The Add Documents tab 730 may include fields to facilitate attaching additional documents to the record for the current case in database 120.

As shown in FIG. 7B, the first user interface 705 used to enter meta data regarding a particular document includes search field 710, case list field 715, New Case button 720, Information tab 725, and Add Documents tab 730. The search field 710, case list field 715, New Case button 720, and Information tab 725 function as described for Case Scanner user interface 700 of FIG. 7A.

Add Documents tab 730 shows attributes about the document itself, such as the corresponding Application Number, Matter Number, and Date the document was created or received. An origin field 740 on Add Documents tab 730 identifies the document's origin, such as, for example, a document from the Client, from the USPTO, or an attorney-generated document. A type field 745 identifies the document type, indicating, for example, an Invention Disclosure, a Request for Case Matter Number, a Notice of Disclosure Obligation, a Correspondence, an application, a response to an office action, or another document type. A scan field 750 facilitates scanning new documents 110 into database 120 of FIG. 2. Scan field 750 includes drop down menus to indicate whether a document is outbound or inbound (e.g., To, From), the origin or destination of the document (e.g., Client, USPTO), the document Type (e.g., Letter), and a field to enter a subject (e.g., Re:). A scan button 755 initiates the scan.

Figure 8:
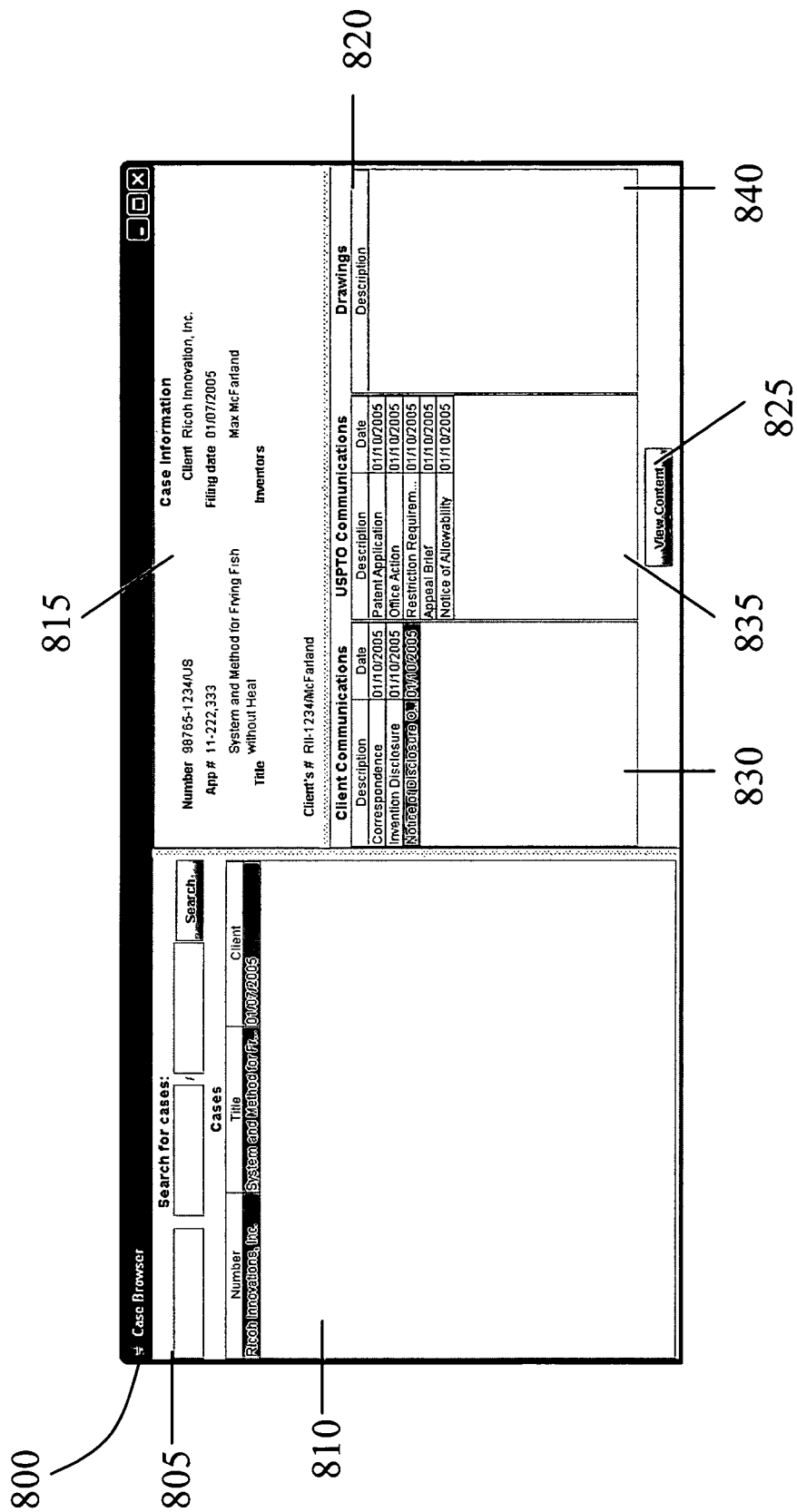
FIG. 8 is an exemplary graphical representation of a second user interface used to control retrieval and viewing of a document identified on a generated Token.

FIG. 8 is an exemplary representation of a second user interface 800 used to control retrieval and viewing of a document identified on a generated Token 400. As shown in FIG. 5A, documents 110 associated with the current case and stored in database 120 are identified on Token 400 as items 545, each of which includes a bar code 555, a correspondence date 550, and a textual summary 540.

As shown in FIG. 8, the second user interface 800 includes a search field 805, a Cases field 810, a Case Information field 815, a document list field 820, and a View Content button 825. Search field 805 allows a user to enter a case and matter number or a bar code number to retrieve a particular document. Alternatively, a bar code scanner can be used to enter this information using the bar code 555 of an item 545 identified on Token 400. Cases field 810 lists, for example, recently accessed cases or cases associated with the current case. Case Information field 815 indicates information associated with a particular document, such as the matter Number, Client, application number ("App #"), Filing Date, Title, Inventors, and client reference number ("Client's #").

The document list field 820 includes, for example, lists of the descriptions and dates of Client Communications 830 and USPTO Communications 835. It also lists Drawings 840 generated for the case. Each entry under Client Communications 830, USPTO Communications 835, and Drawings 840 may be individually selected for retrieval and viewing. Actual retrieval and viewing, for example, on a PC screen, of a selected document is initiated using View Content button 825 (see, e.g., retrieval and viewing 250 depicted in FIG. 2). Retrieval and viewing is implemented as discussed previously with respect to FIGS. 10 and 15.

Figure 17:
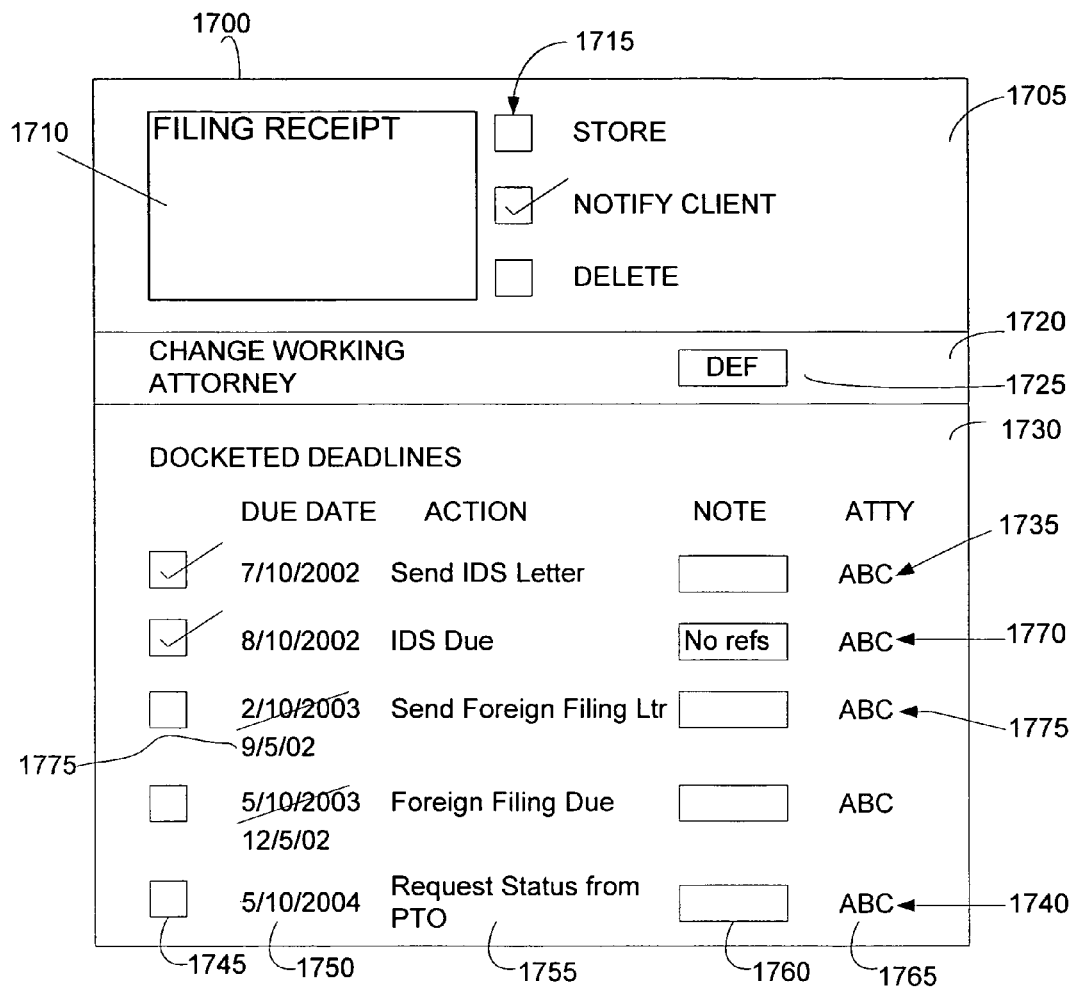
FIG. 17 is a graphical representation of an alternative embodiment of a page of a Token.

A Token 400 can also be used to update the state of a case in database 120 of Token system 200/300. FIG. 17 is an alternative embodiment of a page 1700 of the Token 400 of FIG. 4. The page 1700 includes an action field 1705 showing an image of a filing receipt 1710 and including a plurality of check boxes 1715 to allow a user to choose from, for example, three predetermined actions, Store, Notify Client, and Delete, from which a user has chosen Notify Client. The page 1700 also includes an action field 1720 that includes an input box 1725 to allow a user to change the working attorney. The page 1700 also includes an action field 1730 that includes a listing of docketed deadlines 1735. Each entry 1740 in the listing of docketed deadlines 1735 includes a checkbox 1745, a due date 1750, an action 1755, a note field 1760, and an attorney initial 1765. A user can, for example, mark a checkbox 1745 to indicate completion or enter comments in a note field 1760 as shown in entry 1770, or overwrite a due date 1750 as shown in entry 1775. Thus, a user can use page 1700 of a Token 400 to update the state of a case, as discussed previously with respect to FIG. 18.

Figure 9:
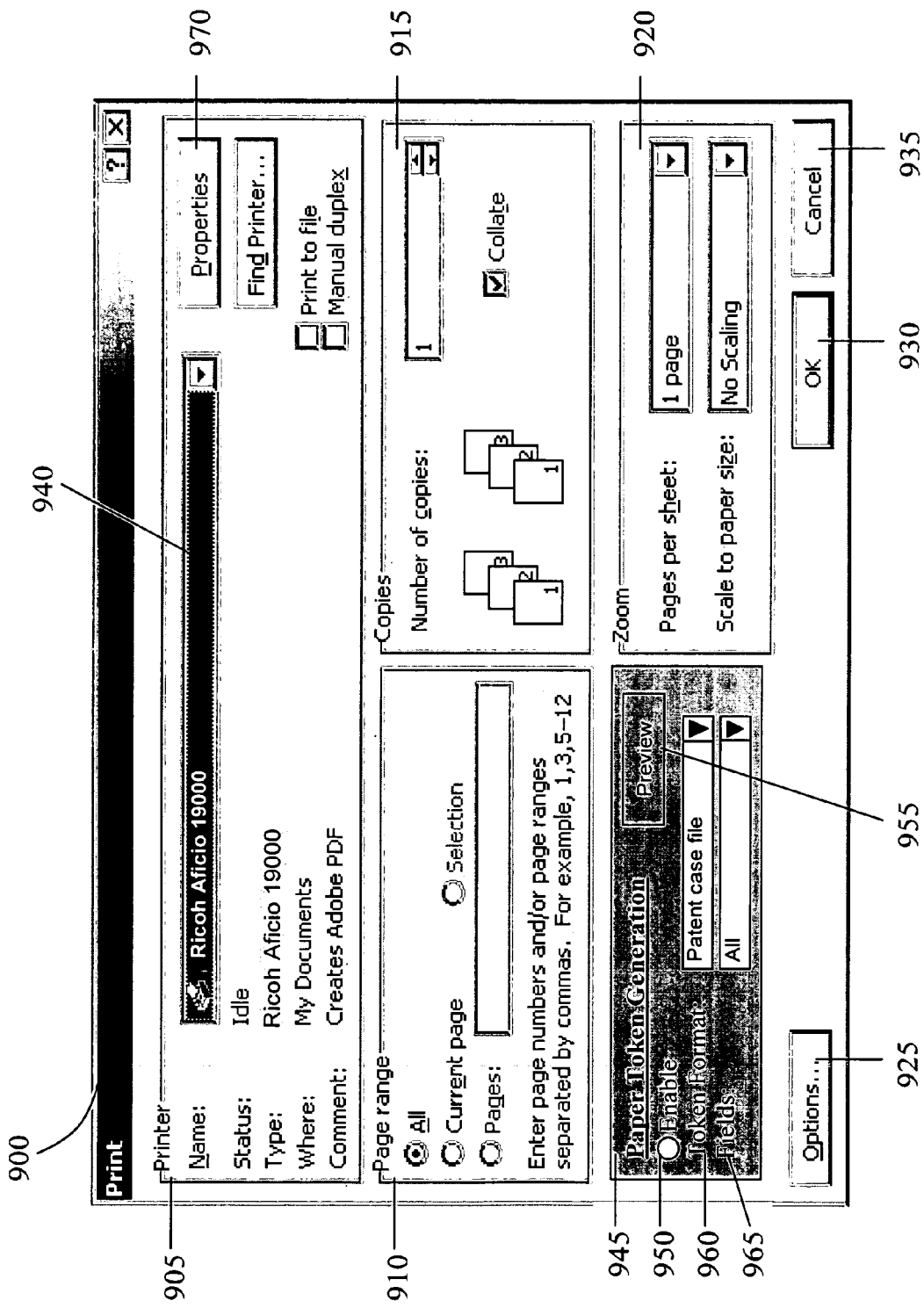
FIG. 9 is a graphical representation of a printer dialog interface to facilitate generation of a Token using a conventional printer and computing device.

FIG. 9 is a printer dialog box 900 to facilitate an alternative embodiment using the Token generation software, a printer, and a computer. To print, a user 140 of Token system 200/300 may invoke the Print dialog on a personal computer 150 and when selecting a Ricoh printer, cause the Token generation software to be applied on the selected case. Printer dialog box 900 of FIG. 9 includes a Printer field 905, Page range field 910, Copies field 915, Zoom field 920, Options button 925, OK button 930, and Cancel button 935, each of which operates similarly to corresponding components common to printer drivers on personal computers.

To invoke the Token generation software, a user 140 would choose, for example, a Ricoh printer driver that supports Token generation from a Name drop down menu 940 in Printer field 905. Selection of a printer that supports Token generation would enable a Paper Token Generation field 945 in Printer driver interface 900. The Paper Token Generation field 945 includes, for example, an Enable button 950 to enable Token generation and printing, and a Preview button 955 to preview the generated Token prior to printing.

A Token Format drop down menu 960 in Paper Token Generation field 945 allows the user to choose from among several formats including, for example, "Patent case file." The Token generation process (see e.g., Token generation 1015 module of FIG. 10) supplies characteristics of the case that can be represented in a Token, such as Token 400. In a patent case file management system, the characteristics might include, for example, data lists to compile the correspondences 530 and 535 that appear on cover page 505 of FIG. 5A, prior art, and thumbnail images of figures 560 that appear on interior pages 510 and 515 of FIGS. 5B and 5C. A Fields drop down menu 965 allows a user to choose to generate All or a subset of the Token fields available. Alternatively, the format of the Token and the information it represents can be chosen in the Properties pages for the Printer, accessed via Properties button 970.

Thus, the Tokens document-based system for adaptive document retrieval preserves the advantages of a paper-based case management system while overcoming many of its deficiencies by using a paper-based interface.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A computer-implemented method for use with a document management system, the computer-implemented method comprising:
using a computer system to perform the steps of:
retrieving data for a case file from the document management system;
creating a visual representation for the case file, the visual representation comprising:
a case identifier of the case file;
an action field including a data entry field for receiving markings from a user for updating a record in the document management system corresponding to the case file, the markings including a plurality of boxes indicating predetermined actions, user notes to correct the record or prognoses;
an index comprising a listing of a first plurality of documents associated with the case file, a first plurality of links to electronic versions of the first plurality of documents in the listing, and a plurality of textual summaries corresponding to the first plurality of documents in the listing, the index divided into a plurality of categories, each category containing a subset of documents in the listing;
a plurality of thumbnail images of one or more of the first plurality of documents associated with the case file;
a summary of a portion of the first plurality of documents associated with the case file and information specified by the user; and
a plurality of related tokens for a plurality of related cases indicating a status of the plurality of related cases and a second plurality of links to electronic versions of a second plurality of documents corresponding to the plurality of related cases; and
printing, on a printed medium, a first token that is a physical representation of the retrieved data, the first token comprising the visual representation of the case file.

2. The method of claim 1 further comprising formatting the data and the index to create the visual representation of the case file to fit in a predetermined area of the physical representation.

3. The method of claim 1 wherein the step of retrieving includes receiving base information relevant to the case file.

4. The method of claim 3 wherein the base information includes minimal information needed to identify the case file.

5. The method of claim 1 further comprising
creating the action field to facilitate user modification of the case file.

6. The method of claim 1 further comprising:
determining a subset of electronic files associated with the case file;
creating a physical representation of at least one electronic file of the subset; and
associating the physical representation of the at least one electronic file with the first token.

7. The method of claim 6 further comprising:
creating a user profile identifying one or more preferred documents; and
accessing the profile to determine the subset.

8. The method of claim 6 further comprising:
inspecting a current electronic file to identify key text;
determining an intended user; and
accessing a database to determine the subset based on the key text and the intended user.

9. The method of claim 1 wherein retrieving data and creating the visual representation further comprises:
identifying the case identifier;
identifying a subset of electronic files relevant to the case file based on the case identifier;
creating a representation for each electronic file; and
assembling the case identifier and compressed representations to fit in a predetermined area.

10. The method of claim 9 wherein retrieving data and creating the visual representation, further comprises:
identifying a case title;
identifying client information;
creating a textual summary for each electronic file;
associating a link with each electronic file; and
assembling the case title, case identifier, client information, textual summaries, and links to fit in a predetermined area of the token.

11. A computer-implemented method of operating a document management system using a first token as a physical representation of a case file on a printed medium, the computer-implemented method comprising:
using a computer system to perform the steps of:
printing, on the printed medium, the first token that is the physical representation of the case file, the first token comprising a visual representation of the case file, the visual representation comprising:
a case identifier of the case file;
an action field including a data entry field for receiving markings from a user for updating a record in the document management system corresponding to the case file, the markings including a plurality of boxes indicating predetermined actions, user notes to correct the record or prognoses;
an index comprising a listing of a first plurality of documents associated with the case file, a first plurality of links to electronic versions of the first plurality of documents in the listing, and a plurality of textual summaries corresponding to the first plurality of documents in the listing, the index divided into a plurality of categories, each category containing a subset of documents in the listing;
a plurality of thumbnail images of one or more of the first plurality of documents associated with the case file;
a summary of a portion of the first plurality of documents associated with the case file and information specified by the user; and
a plurality of related tokens for a plurality of related cases indicating a status of the plurality of related cases and a second plurality of links to electronic versions of a second plurality of documents corresponding to the plurality of related cases;
receiving a selection of one of the first plurality of links included in the printed token;
retrieving an electronic version of the one of the first plurality of documents associated with the selected link; and
providing the electronic version of the one of the first plurality of documents.

12. The method of claim 11 wherein the step of receiving the selection of the one of the first plurality of links comprises receiving data from a bar code scanner.

13. The method of claim 11 wherein receiving the selection of the one of the first plurality of links comprises receiving a reference code from a keypad.

14. The method of claim 11 wherein providing the electronic version of the one of the first plurality of documents comprises transmitting the electronic version of the one of the first plurality of documents for display on a computer display.

15. The method of claim 11 further comprising browsing a set of electronic files associated with the case file, the set including the one of the first plurality of documents.

16. A computer-implemented method of using a first token as a physical representation of a case file on a printed medium to modify the case file in a document management system, the computer-implemented method comprising:
 using a computer system to perform the steps of:
  receiving an image of a first token that is the physical representation of the case file, the first token comprising a visual representation of the case file, the visual representation comprising:
   a case identifier of the case file;
   an action field including a data entry field for receiving markings from a user for updating a record in the document management system corresponding to the case file, the markings including a plurality of boxes indicating predetermined actions, user notes to correct the record or prognoses;
   an index that comprises a listing of a first plurality of documents associated with the case file, a first plurality of links to electronic versions of the first plurality of documents in the listing, and a plurality of textual summaries corresponding to the first plurality of documents in the listing, the index divided into a plurality of categories, each category containing a subset of documents in the listing;
   a plurality of thumbnail images of one or more of the first plurality of documents associated with the case file;
   a summary of a portion of the first plurality of documents associated with the case file and information specified by the user; and
   a plurality of related tokens for a plurality of related cases indicating a status of the plurality of related cases and a second plurality of links to electronic versions of a second plurality of documents corresponding to the plurality of related cases;
  retrieving an electronic version of the first token;
  comparing the first token to the electronic version of the token to determine differences between the first token and the electronic version of the first token; and
  updating the case file based on a result of the comparison.

17. The method of claim 16 further comprising retrieving and displaying a viewable representation of the first token.

18. The method of claim 16 wherein updating the case file comprises:
 receiving an electronic file;
 storing the electronic file in a database; and
 associating the electronic file with the case file.

19. The method of claim 16 wherein updating the case file comprises annotating an electronic file with information pertaining to the case file.

20. The method of claim 16 wherein updating the case file comprises annotating an electronic file with information pertaining to the electronic file itself.

21. A non-transitory computer-readable storage medium for generating a first token as a physical representation of a case file on a printed medium for a document management system, the non-transitory computer-readable storage medium storing computer program modules configured to execute on a computer processor, the computer program modules comprising:
 an identification module for retrieving information regarding a case file; and
 a generation module for creating the first token as the physical representation of the case file and for printing the first token on the printed medium, the first token comprising a visual representation of the case file, the visual representation comprising:
  a case identifier of the case file;
  an action field including a data entry field for receiving markings from a user for updating a record in the document management system corresponding to the case file, the markings including a plurality of boxes indicating predetermined actions, user notes to correct the record or prognoses;
  an index comprising a listing of a first plurality of documents associated with the case file, a first plurality of links to electronic versions of the first plurality of documents in the listing, and a plurality of textual summaries corresponding to the first plurality of documents in the listing, the index divided into a plurality of categories, each category containing a subset of documents in the listing;
  a plurality of thumbnail images of one or more of the first plurality of documents associated with the case file;
  a summary of a portion of the first plurality of documents associated with the case file and information specified by the user; and
  a plurality of related tokens for a plurality of related cases indicating a status of the plurality of related cases and a second plurality of links to electronic versions of a second plurality of documents corresponding to the plurality of related cases.

22. The non-transitory computer-readable storage medium of claim 21 further comprising a formatting module for formatting the visual representation of the case file for inclusion in the physical representation, the formatting module coupled to the generation module.

23. The non-transitory computer-readable storage medium of claim 21 further comprising an identification and capture module for identifying a document to be included as part of the physical representation and retrieving the document from the document management system, the identification and capture module coupled to the generation module and the document management system.

24. The non-transitory computer-readable storage medium of claim 21 further comprising a trigger module to initiate generation of the physical representation, the trigger module coupled to the generation module.

25. The non-transitory computer-readable storage medium of claim 23 wherein the identification and capture module further determines at least one user profile identifying a preferred document and the non-transitory computer-readable storage medium further comprising:
 an accessing module coupled to the profile and the document management system to access the user profile to determine one or more electronic files to add to the physical representation.

26. The non-transitory computer-readable storage medium of claim 22 wherein the formatting module further comprises a summarizing module to create a representation for each document identified.

27. A non-transitory computer-readable storage medium for using a first token to operate a document management system, the non-transitory computer-readable storage medium storing computer program modules configured to execute on a computer processor, the computer program modules comprising:

a generation module to print the first token as a physical representation of a case file on a printed medium, the first token including a visual representation of the case file, the visual representation comprising:
   a case identifier of the case file;
   an action field including a data entry field for receiving markings from a user for updating a record in the document management system corresponding to the case file, the markings including a plurality of boxes indicating predetermined actions, user notes to correct the record or prognoses;
   an index comprising a listing of a first plurality of documents associated with the case file, a first plurality of links to electronic versions of the first plurality of documents in the listing, and a plurality of textual summaries corresponding to the first plurality of documents in the listing, the index divided into a plurality of groups corresponding to a plurality of categories of the plurality of documents in the listing;
   a plurality of thumbnail images of one or more of the first plurality of documents associated with the case file;
   a summary of a portion of the first plurality of documents associated with the case file and information specified by the user; and
   a plurality of related tokens for a plurality of related cases indicating a status of the plurality of related cases and a second plurality of links to electronic versions of a second plurality of documents corresponding to the plurality of related cases;
an identification module to receive a selection of one of the first plurality of links included in token; and
a retrieval module coupled to the identification module to retrieve an electronic version of the one of the first plurality of documents associated with the selected link.

28. The non-transitory computer-readable storage medium of claim 27 further comprising an annotation module coupled to the identification module to attach data to the one of the first plurality of documents pertaining to the case.

29. The non-transitory computer-readable storage medium of claim 27 further comprising an annotation module coupled to the identification module to attach data to the one of the first plurality of documents pertaining to the document itself.

30. The non-transitory computer-readable storage medium of claim 27 further comprising a browsing module coupled to the retrieval module to list a third plurality of documents associated with the case, the browsing module also coupled to provide information to a display device.

31. The non-transitory computer-readable storage medium of claim 27 wherein the document management system includes a database having the electronic version of the one of the first plurality of documents, and the system further comprises:
   an input device coupled to the database to receive a reference code associated with the electronic version of the one of the first plurality of documents and present the reference code on the first token; and
   a display device coupled to the database upon which to present the electronic version of the one of the first plurality of documents.

32. The non-transitory computer-readable storage medium of claim 31 wherein the input device is a bar code scanner.

33. The non-transitory computer-readable storage medium of claim 31 wherein the input device is a keypad.

34. A non-transitory computer-readable storage medium for using a first token to modify a record corresponding to a case file in a document management system, the non-transitory computer-readable storage medium storing computer program modules configured to execute on a computer processor, the computer program modules comprising:
   a retrieval module for receiving an image of a first token that is a physical representation of a case file on a printed medium and for retrieving an electronic version of the first token, the retrieval module coupled to the document management system, wherein the first token comprises a visual representation of the case file, the visual representation comprising:
      a case identifier of the case file;
      an action field including a data entry field for receiving markings from a user for updating the record corresponding to the case file, the markings including a plurality of boxes indicating predetermined actions, user notes to correct the record or prognoses;
      an index comprising a listing of a first plurality of documents associated with the case file, a first plurality of links to electronic versions of the plurality of first documents in the listing, and a plurality of textual summaries corresponding to the first plurality of documents in the listing, the index divided into a plurality of categories, each category containing a subset of documents in the listing;
      a plurality of thumbnail images of one or more of the first plurality of documents associated with the case file;
      a summary of a portion of the first plurality of documents associated with the case file and information specified by the user; and
      a plurality of related tokens for a plurality of related cases indicating a status of the plurality of related cases and a second plurality of links to electronic versions of a second plurality of documents corresponding to the plurality of related cases;
   a comparison module for comparing the first token to the electronic version of the first token to determine differences between the first token and the electronic version of the first token, the comparison module coupled to the retrieval module; and
   an updating module coupled to the comparison module and to the document management system for modifying the record corresponding to the case file in the document management system using output from the comparison module.

35. The non-transitory computer-readable storage medium of claim 34 further comprising a generation module to generate the first token representing the case file, the index included in the first token further comprising at least one action field for receiving markings from the user, the generation module coupled to the document management system.

36. The non-transitory computer-readable storage medium of claim 34 wherein the updating module comprises an annotation module to annotate an electronic file with information pertaining to the case file, the annotation module coupled to receive input from the user and coupled to the updating module for modifying the record in the document management system.

37. The non-transitory computer-readable storage medium of claim 34 wherein the updating module comprises an annotation module to annotate the electronic file with information pertaining to the electronic file itself, the annotation module coupled to receive input from the user and coupled to the updating module for modifying the record in the document management system.

* * * * *